United States Patent
Kawada et al.

(10) Patent No.: US 8,448,742 B2
(45) Date of Patent: May 28, 2013

(54) ELECTRIC POWER STEERING SYSTEM

(75) Inventors: Yoshikazu Kawada, Nara (JP);
Terukazu Nakajima, Nara (JP);
Toshiharu Mikami, Aichi (JP); Shingo Takayama, Nara (JP)

(73) Assignee: JTEKT Corporation, Osaka (JP)

( * ) Notice: Subject to any disclaimer, the term of this patent is extended or adjusted under 35 U.S.C. 154(b) by 201 days.

(21) Appl. No.: 12/737,622

(22) PCT Filed: Jul. 31, 2009

(86) PCT No.: PCT/JP2009/003647
§ 371 (c)(1),
(2), (4) Date: Jan. 31, 2011

(87) PCT Pub. No.: WO2010/013490
PCT Pub. Date: Feb. 4, 2010

(65) Prior Publication Data
US 2011/0120798 A1 May 26, 2011

(30) Foreign Application Priority Data
Aug. 1, 2008 (JP) ................................. 2008-199889

(51) Int. Cl.
*B62D 5/04* (2006.01)
(52) U.S. Cl.
USPC .......................................... 180/444; 180/443
(58) Field of Classification Search
USPC .................................................. 180/443, 444
See application file for complete search history.

(56) References Cited

U.S. PATENT DOCUMENTS

| 5,482,128 | A | 1/1996 | Takaoka et al. |
| 7,415,898 | B2 | 8/2008 | Ishihara et al. |
| 2002/0029923 | A1 | 3/2002 | Tanioka |
| 2006/0021451 | A1 | 2/2006 | Ishihara et al. |
| 2007/0272471 | A1 | 11/2007 | Kuroumaru et al. |
| 2008/0000713 | A1* | 1/2008 | Yoshioka et al. ............. 180/444 |
| 2008/0023251 | A1* | 1/2008 | Inaguma et al. ............. 180/400 |

FOREIGN PATENT DOCUMENTS

| CN | 1727859 A | 2/2006 |
| EP | 1 442 960 A2 | 8/2004 |
| JP | 9-48355 | 2/1997 |
| JP | 2002-079949 A | 3/2002 |
| JP | 2003-48549 | 2/2003 |
| JP | 2003-327142 A | 11/2003 |
| JP | 2005-035319 A | 2/2005 |
| JP | 2005-264401 A | 9/2005 |
| JP | 2007-245804 A | 9/2007 |
| JP | 2008-111808 A | 5/2008 |
| WO | WO-2005/080174 A1 | 9/2005 |

* cited by examiner

*Primary Examiner* — Tony H. Winner
*Assistant Examiner* — Jacob Knutson
(74) *Attorney, Agent, or Firm* — Rabin & Berdo, P.C.

(57) ABSTRACT

An electric power steering system (1) includes a tubular sensor housing (34) which accommodates a torque sensor (20), a gear housing (32) which accommodates a speed reduction mechanism (24), and an upper bearing (40) and a lower bearing (41) which rotatably support a steering shaft (3) on opposite sides of the speed reduction mechanism (24). The gear housing (32) includes a tubular lower housing (37) supporting the lower bearing (41), and an upper housing (36). The upper housing (36) includes an inner tube (67), an outer tube (68), and an annular connection wall (69) connecting the inner tube (67) and the outer tube (68). The outer tube (68) is press-fitted in the lower housing (37). The inner tube (67) is press-fitted to an inner periphery (72) of a lower portion (71) of the sensor housing (34), whereby the inner tube (67) has a reduced diameter. As a result, an outer ring (44) of the upper bearing (40) is tightly fitted and supported in the inner tube (67).

16 Claims, 16 Drawing Sheets

ELECTRIC POWER STEERING SYSTEM

TECHNICAL FIELD

The present invention relates to an electric power steering system.

BACKGROUND ART

Electric power steering systems are adapted to transmit a rotation output of an electric motor to a steering shaft via a speed reduction mechanism. The speed reduction mechanism includes a worm, a worm wheel, and a gear housing which accommodates the worm and the worm wheel. The gear housing includes first and second housings disposed on opposite sides of the worm wheel in opposed relation. The worm wheel is rotatably supported in bearing retention holes of the first and second housings via a pair of bearings (see, for example, PLT1).
Citation List
Patent Literature
PLT1: JP-A-2002-79949

SUMMARY OF INVENTION

Technical Problem

Outer rings of the respective bearings are loosely fitted in the corresponding bearing retention holes with outer peripheries thereof being spaced from inner peripheries of the corresponding bearing retention holes. Further, the first and second housings are loosely engaged with each other in spaced relation. As a result, the paired bearings are liable to be offset from the center positions of the corresponding housings. Therefore, the paired bearings are liable to be brought out of coaxial relation, resulting in improper meshing engagement of the worm and the worm wheel. This results in abnormal noise.

The following assembling method is conceivable for preventing the paired bearings from being offset from the center positions of the corresponding housings. The center position of the first housing is biased radially of the second housing toward the meshing-engaged portions of the worm and the worm wheel supported by the second housing so as to bring the respective bearings into abutment against the corresponding bearing retention holes. In this state, the first and second housings are fixed to each other. However, this assembling method is not easy, requiring special skill. As a result, the production costs are increased.

Solution to Problem

It is an object of the present invention to provide an inexpensive electric power steering system which is substantially free from occurrence of abnormal noise.

According to one aspect of the present invention to achieve the above object, there is provided an electric power steering system, which includes a column tube which rotatably supports a steering shaft coupled to a steering member, a tubular sensor housing configured by increasing the diameter of an axially lower portion of the column tube, a torque sensor accommodated in the sensor housing for detecting a steering torque, a speed reduction mechanism which transmits rotation of a steering assist electric motor to the steering shaft, a gear housing which accommodates the speed reduction mechanism, and an upper bearing and a lower bearing disposed on upper and lower sides of the speed reduction mechanism and rotatably supporting the steering shaft. The gear housing includes a tubular lower housing which rotatably supports the steering shaft via the lower bearing, and an upper housing. The upper housing includes an inner tube, an outer tube and an annular connection wall connecting the inner tube and the outer tube. The outer tube is press-fitted to an inner periphery of an upper portion of the lower housing. The inner tube rotatably supports the steering shaft via the upper bearing. The inner tube is press-fitted to an inner periphery of an axially lower portion of the sensor housing, whereby the inner tube has a reduced diameter so that an outer ring of the upper bearing is tightly fitted and supported in the inner tube.

According to this aspect, the upper housing, the lower housing and the upper bearing can be positioned coaxially with each other at their center positions, so that the offset between the center positions of the upper bearing and the lower bearing can be minimized. This suppresses the occurrence of the abnormal noise, which may otherwise occur due to the offset of the center positions.

The positioning of the upper housing, the lower housing and the upper bearing is achieved by the press-fitting, which does not require special skill. This facilitates the assembling, thereby reducing the production costs. Before the diameter of the inner tube is reduced by the press-fitting in the sensor housing, the upper bearing can be easily attached to the inner tube in the assembling. As a result, the production costs can be further reduced.

In the present invention, the torque sensor preferably includes an annular main body engaged with an inner periphery of the sensor housing.

More preferably, the torque sensor is positioned axially of the sensor housing with an end of the inner tube in abutment against an end face of the main body of the torque sensor. In this case, the inner tube can be used for the positioning of the main body of the torque sensor, thereby further reducing the production costs.

Further preferably, the sensor housing includes a positioning member projecting inward thereof, and the main body of the torque sensor is held between the end of the inner tube and the positioning member. In this case, the positioning member for the positioning of the main body of the torque sensor is provided on {as a part of} the sensor housing, so that the number of components can be reduced. This further reduces the production costs. The positioning member may be a projection provided on {as a part of} the sensor housing.

In the present invention, an annular spacer is preferably provided between the end of the inner tube of the upper housing and the end face of the main body of the torque sensor, and the spacer preferably includes an annular resilient member which is resiliently compressed axially. The sensor housing preferably includes a positioning member projecting inward thereof, and the main body of the torque sensor and the spacer are preferably held between the end of the inner tube and the positioning member. In this case, variations in axial dimensions of the sensor housing, the torque sensor, the inner tube of the upper housing and other components can be accommodated by resilient deformation of the resilient member. As a result, the torque sensor can be stably retained for a longer period of time.

Further preferably, the spacer includes an annular metal core to which the resilient member is fixed. In this case, the metal core suppresses excessive deformation of the resilient member. This prevents improper mounting of the resilient member of the spacer when the electric power steering system is assembled.

Preferably, a space is provided between a part of the outer periphery of the main body of the torque sensor and the inner periphery of the sensor housing. A part of the resilient member may be resiliently compressed radially of the sensor housing to be accommodated in the space. In this case, the torque sensor can be stably supported radially.

In the present invention, the torque sensor preferably includes a wiring extending from a part of the outer periphery of the main body, and the sensor housing preferably has an insertion hole through which the wiring extends out of the sensor housing.

In this case, the torque sensor is inserted into the sensor housing from an axial end opening of the sensor housing, for example, when the system is assembled. At this time, the main body of the torque sensor is turned within the sensor housing with the wiring of the torque sensor passed through the insertion hole, whereby the main body and the sensor housing are disposed coaxially with each other.

The outer periphery of the main body may include a part of a spherical surface. The spherical outer periphery of the main body does not interfere with the inner periphery of the sensor housing when the main body is turned, thereby facilitating the operation.

Further, the insertion hole may be sealed with the inner tube and the main body of the torque sensor. In this case, foreign matter is prevented from intruding into the sensor housing from the outside through the insertion hole. In addition, the inner tube and the main body of the torque sensor are used for the sealing of the insertion hole, thereby simplifying or obviating a sealing member to be used besides these components. As a result, it is possible to simplify the construction, thereby reducing the production costs.

In the present invention, the connection wall may have an annular groove extending around the inner tube, and a lower end of the sensor housing may be inserted in the annular groove. In this case, the provision of the annular groove prevents formation of a concavely curved fillet portion between the connection wall and the inner tube. Therefore, the lower end of the sensor housing is prevented from riding on the fillet portion. Further, the press-fitting depth of the sensor housing is prevented from varying from system to system due to the ride-on.

In the present invention, the outer tube may have a groove provided in an outer periphery thereof as extending circumferentially thereof. In this case, when a lubricant present in the gear housing is liable to move axially of the outer tube on the outer periphery of the outer tube, the groove suppresses the movement of the lubricant. As a result, the lubricant is substantially prevented from leaking outside the gear housing through a gap between the outer periphery of the outer tube and the inner periphery of the upper portion of the lower housing. Examples of the groove extending circumferentially include a circumferential groove and a spiral groove.

In the present invention, it is advantageous that: the inner periphery of the sensor housing includes a first greater diameter portion, and a second greater diameter portion having a greater diameter than the first greater diameter portion; the outer periphery of the main body of the torque sensor is engaged with the first greater diameter portion; and the outer periphery of the inner tube of the upper housing is press-fitted to the second greater diameter portion. In this case, the second greater diameter portion has a greater diameter than the first greater diameter portion with which the main body of the torque sensor is engaged. Therefore, when the torque sensor is mounted in the sensor housing, the coaxial positioning of the main body and the sensor housing can be easily achieved by turning the main body of the torque sensor in a radially inward portion of the second greater diameter portion.

The torque sensor includes a wiring extending from a part of the outer periphery of the main body, and the sensor housing has an insertion hole through which the wiring extends out of the sensor housing. More preferably, the insertion hole may include an elongated hole extending from the first greater diameter portion to the second greater diameter portion of the sensor housing. In this case, the main body of the torque sensor disposed coaxially with the sensor housing in the radially inward portion of the second greater diameter portion can be smoothly inserted into the first greater diameter portion.

The outer periphery of the main body of the torque sensor is formed of a synthetic resin, and the torque sensor includes a plurality of resiliently deformable projections disposed on the outer periphery of the main body thereof in circumferentially spaced relation. Preferably, the projections may be resiliently engaged with the first greater diameter portion. In this case, the main body of the torque sensor can be supported by the first greater diameter portion by the function of the projections resiliently engaged with the first greater diameter portion. Therefore, the sensor housing and the torque sensor can be handled as a single unit. For example, a production process can be easily performed, in which the electric power steering system is assembled by bringing the sensor housing of the aforementioned unit into engagement with the inner tube from above while an axis of the inner tube of the upper housing of the gear housing in which the speed reduction mechanism is accommodated is directed vertically upward.

The foregoing and other advantages, features and effects of the present invention will become more apparent from the following description of embodiments with reference to the attached drawings.

DESCRIPTION OF EMBODIMENTS

Figure 1:
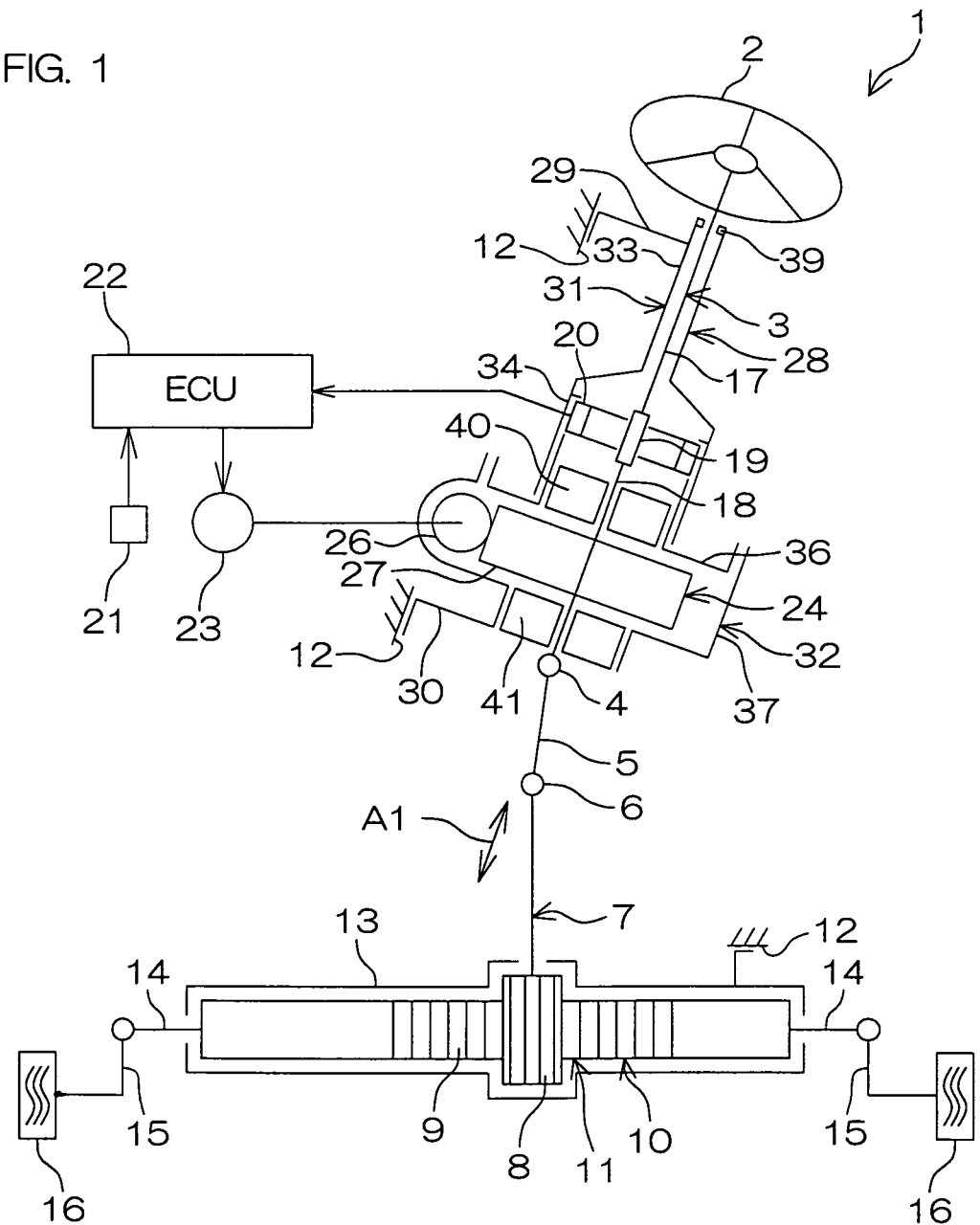
FIG. 1 is a schematic diagram showing the schematic construction of an electric power steering system according to a first embodiment of the present invention.

Preferred embodiments of the present invention will be described with reference to the attached drawings. FIG. 1 is a schematic diagram showing the schematic construction of an electric power steering system according to a first embodiment of the present invention. Referring to FIG. 1, the electric power steering system (EPS) 1 includes a steering shaft 3 coupled to a steering member 2 such as a steering wheel, an intermediate shaft 5 coupled to the steering shaft 3 via a first universal joint 4, a pinion shaft 7 coupled to the intermediate shaft 5 via a second universal joint 6, and a rack shaft 10 serving as a steerable shaft extending transversely of a motor vehicle, and having rack teeth 9 meshed with pinion teeth 8 provided in the vicinity of an end of the pinion shaft 7.

The pinion shaft 7 and the rack shaft 10 collectively define a rack-and-pinion mechanism, which serves as a steering gear 11. The rack shaft 10 is supported in a linearly reciprocally movable manner via a plurality of bearings not shown in a rack housing 13 fixed to a vehicle body 12. The rack shaft 10 is connected to a pair of tie rods 14. The tie rods 14 are respectively coupled to corresponding steerable wheels 16 via corresponding knuckle arms 15.

When the steering member 2 is operated to rotate the steering shaft 3, the rotation is converted into a linear movement of the rack shaft 10 transverse of the motor vehicle by the pinion teeth 8 and the rack teeth 9. Thus, the steering of the steerable wheels 16 is achieved.

The steering shaft 3 is divided into an input shaft 17 connected to the steering member 2, and an output shaft 18 connected to the pinion shaft 7. The input shaft 17 and the output shaft 18 are coaxially coupled to each other via a torsion bar 19. When a steering torque is inputted to the input shaft 17, the torsion bar 19 is resiliently twisted, whereby the input shaft 17 and the output shaft 18 are rotated relative to each other.

The electric power steering system 1 includes a torque sensor 20 which detects the steering torque based on a relative rotative displacement between the input shaft 17 and the output shaft 18 via the torsion bar 19, a vehicle speed sensor 21 which detects the speed of the motor vehicle, an ECU (Electronic Control Unit) 22 serving as a controller, an electric motor 23 which generates a steering assist force, and a speed reduction mechanism 24 which reduces the speed of the output rotation of the electric motor 23.

Detection signals of the torque sensor 20 and the vehicle speed sensor 21 are inputted to the ECU 22. The ECU 22 controls the electric motor 23 for steering assist based on the results of the detection of the torque and the vehicle speed. The output rotation of the electric motor 23 is transmitted to the pinion shaft 7 after its speed is reduced by the speed reduction mechanism 24, and converted into the linear movement of the rack shaft 10 for the steering assist.

The speed reduction mechanism 24 transmits the output rotation of the steering assist electric motor 23 to the output shaft 18 of the steering shaft 3. The speed reduction mechanism 24 includes a worm 26 as a driving gear, and a worm wheel 27 as a driven gear meshed with the worm 26.

The worm 26 is disposed coaxially with an output shaft (not shown) of the electric motor 23, and rotatively driven by the electric motor 23.

The worm wheel 27 is coupled to the output shaft 18 of the steering shaft 3 in a manner such as to permit co-rotation of the output shaft but prohibit axial movement of the output shaft.

The electric power steering system 1 includes a steering column 28 which rotatably supports the steering shaft 3. The steering column 28 is supported by the vehicle body 12 via first and second brackets 29, 30.

Figure 2:
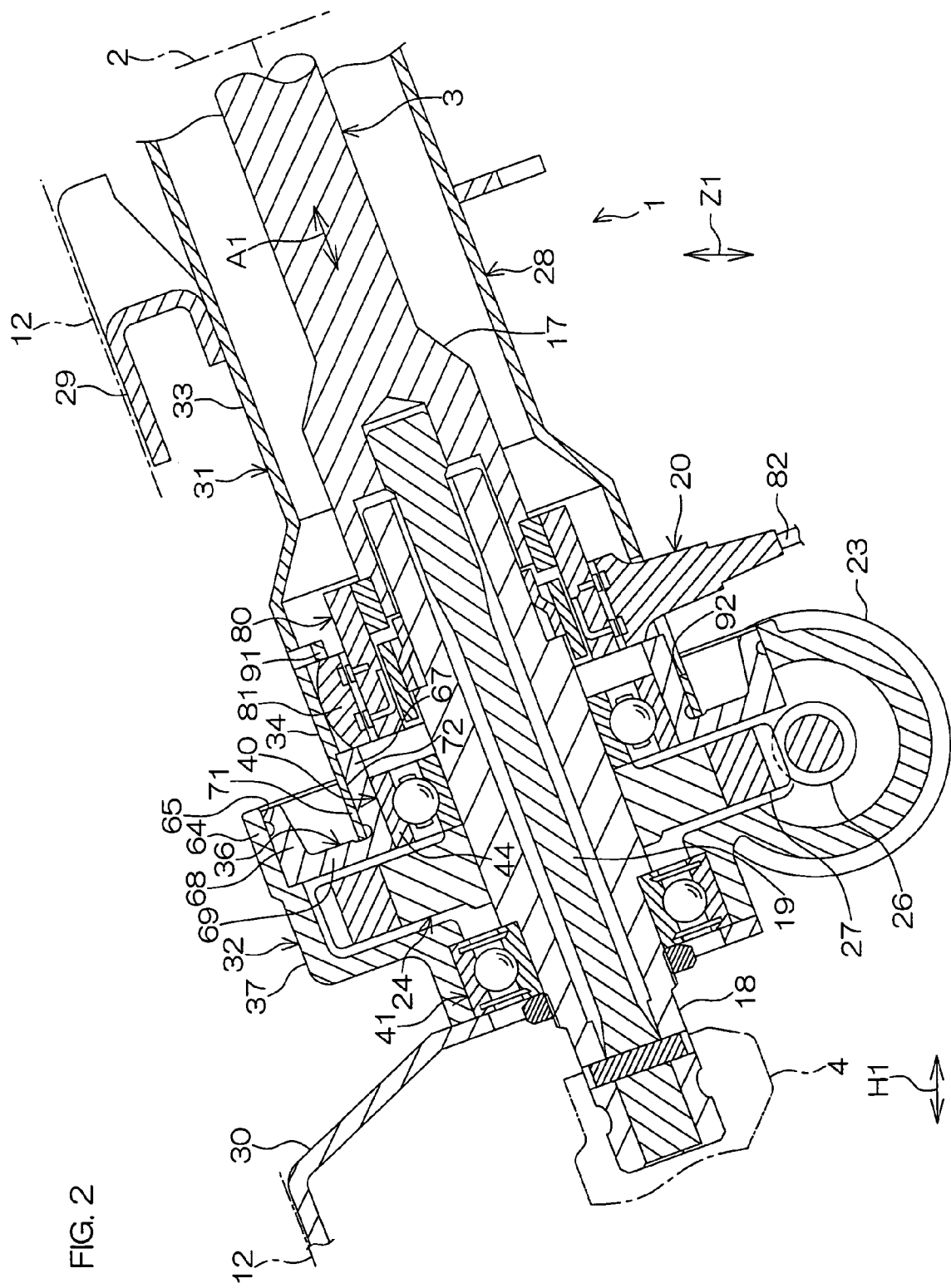
FIG. 2 is a sectional view of major portions of the electric power steering system of FIG. 1.
Figure 3:
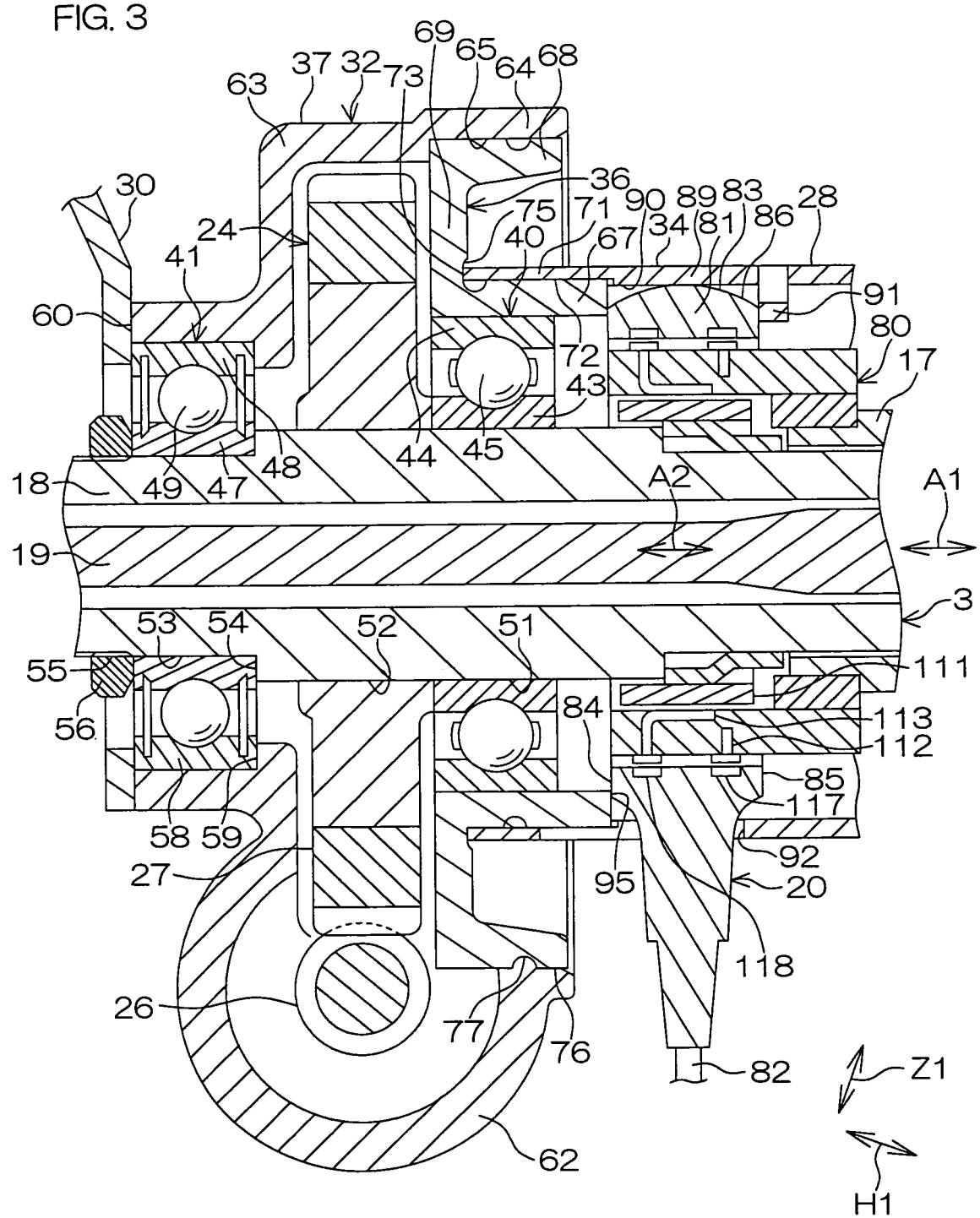
FIG. 3 is an enlarged sectional view of major portions of the electric power steering system of FIG. 1.

FIG. 2 is a sectional view of major portions of the electric power steering system 1 of FIG. 1. Referring to FIGS. 1 and 2, the steering column 28 extends parallel to axial directions A1 of the steering shaft 3, and is inclined with respect to anteroposterior directions of the motor vehicle. For example, the steering column 3 has a center axis inclined with respect to horizontal directions H1 with the steering member 2 being disposed on an upper side. Vertical directions Z1 are shown in FIGS. 2 and 3.

The steering column 28 includes a column tube 31 which accommodates a part of the steering shaft 3, and a gear housing 32 which accommodates the speed reduction mechanism 24. The column tube 31 and the gear housing 32 are separate members which are coupled to each other.

The column tube 31 defines an upper portion and a middle portion of the steering column 28 in the axial directions A1 of the steering shaft 3. The column tube 31 is composed of a metal such as steel. The column tube 31 rotatably supports the steering shaft 3. The column tube 31 is fixed to the vehicle body 12 via the first bracket 29.

The column tube 31 includes an upper portion 33 defined in the axial directions A1 of the steering shaft 3, and a lower portion serving as a sensor housing 34. The upper portion 33 and the sensor housing 34 are unitarily formed of a single material. The upper portion 33 has a smaller diameter than the lower portion serving as the sensor housing 34. The sensor housing 34 has a greater diameter than the upper portion 33, and accommodates the torque sensor 20. The sensor housing 34 is tubular, and the diameter of the sensor housing 34 is increased by plastically deforming the lower portion of the column tube 31. A lower end portion of the sensor housing 34 is connected to the gear housing 32.

The gear housing 32 defines a lower portion of the steering column 28 in the axial directions A1 of the steering shaft 3. The gear housing 32 is supported by the vehicle body 12 via the second bracket 30. The gear housing 32 supports the electric motor 23. The gear housing 32 is formed of a metal such as an aluminum alloy. The gear housing 32 includes an upper housing 36 and a lower housing 37. The upper housing 36 and the lower housing 37 are separate members which are engaged with each other.

The electric power steering system 1 includes a bearing 39 which rotatably supports an axially upper portion of the input shaft 17 of the steering shaft 3. The bearing 39 is retained at an upper end portion of the column tube 31 of the steering column 28.

The electric power steering system 1 includes an upper bearing 40 and a lower bearing 41 which support the output shaft 18 of the steering shaft 3.

The upper bearing 40 and the lower bearing 41 are disposed on opposite sides of the worm wheel 27 defined in the axial directions A1 of the steering shaft 3. The upper bearing 40 is disposed at an upper position defined in the axial directions A1 of the steering shaft 3, and retained by the upper housing 36. The lower bearing 41 is disposed at a lower position defined in the axial directions A1 of the steering shaft 3, and retained by the lower housing 37.

FIG. 3 is an enlarged view of major portions shown in FIG. 2. Referring to FIG. 3, the upper bearing 40 is a rolling bearing and also an open bearing. The upper bearing 40 includes an inner ring 43, an outer ring 44 and a plurality of balls 45 as rolling elements.

The lower bearing 41 is a rolling bearing and also a sealed bearing as a kind of seal bearing. The lower bearing 41 includes an inner ring 47, an outer ring 48 and a plurality of balls 49 as rolling elements.

The upper bearing 40 and the lower bearing 41 rotatably support the input shaft 17 of the steering shaft 3 via the output shaft 18 and the torsion bar 19.

The output shaft 18 has a first engagement portion 51 engaged with the inner ring 43 of the upper bearing 40, a second engagement portion 52 engaged with the worm wheel 27, a third engagement portion 53 engaged with the inner ring 47 of the lower bearing 41, a step 54 which connects the second and third engagement portions 52, 53 with each other, and a male thread portion 55 adjacent to the third engagement portion 53. A nut 56 is threadingly engaged with the male thread portion 55.

The inner ring 43 of the upper bearing 40 is engaged in an interference fit with the first engagement portion 51. A lower end face of the inner ring 43 of the upper bearing 40 abuts against an upper end face of the worm wheel 27. The worm wheel 27 is press-fitted and fixed around the second engagement portion 52. The inner ring 47 of the lower bearing 41 is held between the third engagement portion 53 of the output shaft 18 and the nut 56. The inner ring 47 of the lower bearing 41 is engaged in an interference fit with the third engagement portion 53.

A lower portion of the lower housing 37 defined in the axial directions A1 of the steering shaft 3 has a bearing retention hole 58 which retains the lower bearing 41, and an annular step 59 adjacent to the bearing retention hole 58. The second bracket 30 is fixed to a lower end face 60 of the lower housing 37. The second bracket 30 functions as a restriction member which restricts the downward movement of the lower bearing 41 in the axial directions A1.

The outer ring 48 of the lower bearing 41 is engaged with the bearing retention hole 58 of the lower housing 37. With the outer ring 48 being held between the step 59 and the second bracket 30, the bidirectional axial (A1) movement of the outer ring 48 with respect to the gear housing 32 is restricted.

An upper portion of the lower housing 37 defined in the axial directions A1 of the steering shaft 3 includes a first tubular portion 62 which accommodates the worm 26, a second tubular portion 63 which accommodates the worm wheel 27, and a tubular connection portion 64 connected to the upper housing 36. The connection portion 64 has an inner periphery serving as an engagement surface 65.

In FIGS. 2 and 3, the first tubular portion 62 has a center axis extending perpendicularly to the paper face. The second tubular portion 63, the connection portion 64 and the steering shaft 3 are disposed coaxially with each other.

Figure 4:
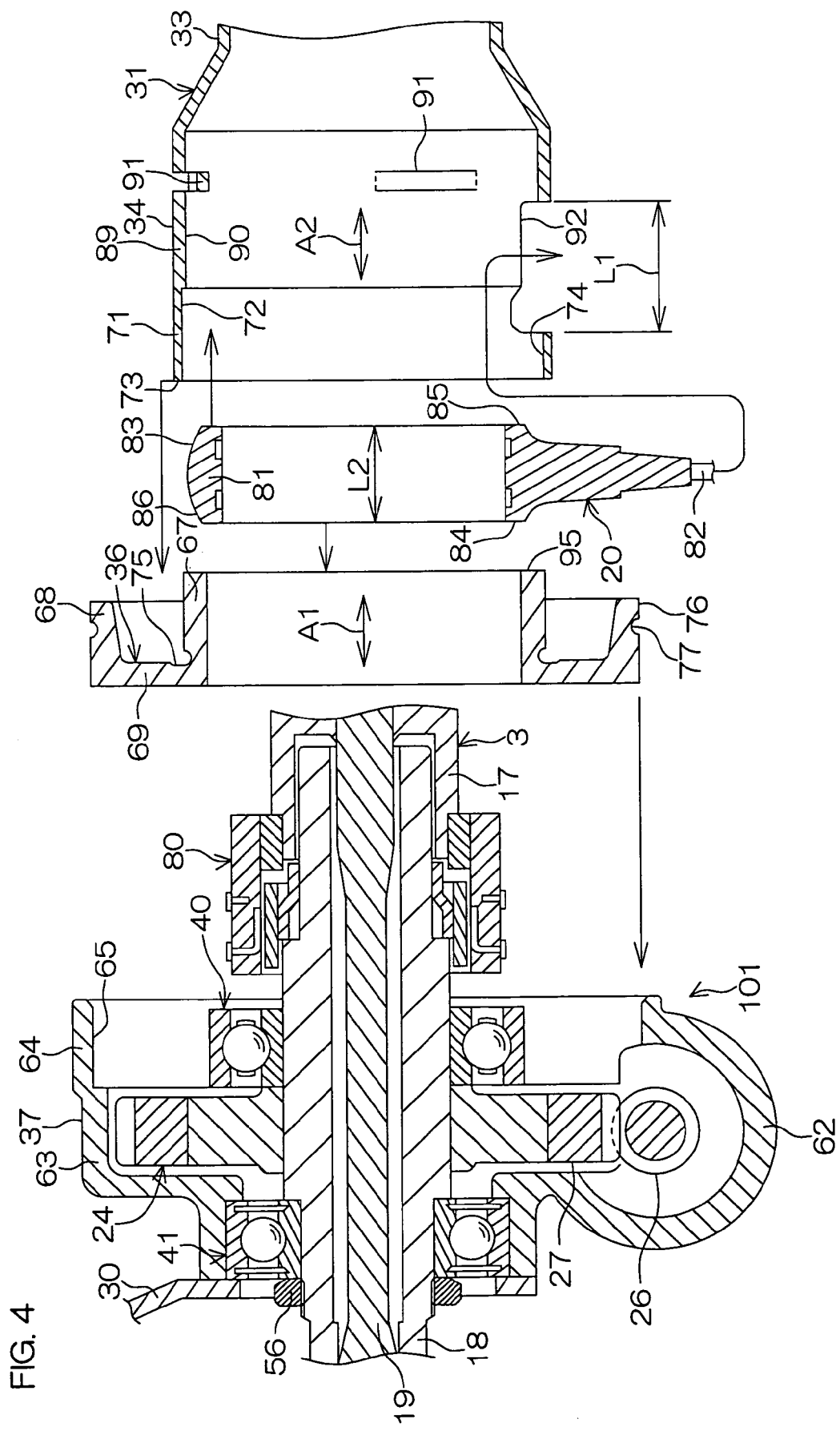
FIG. 4 is an exploded sectional view of major portions of the electric power steering system of FIG. 1.
Figure 5:
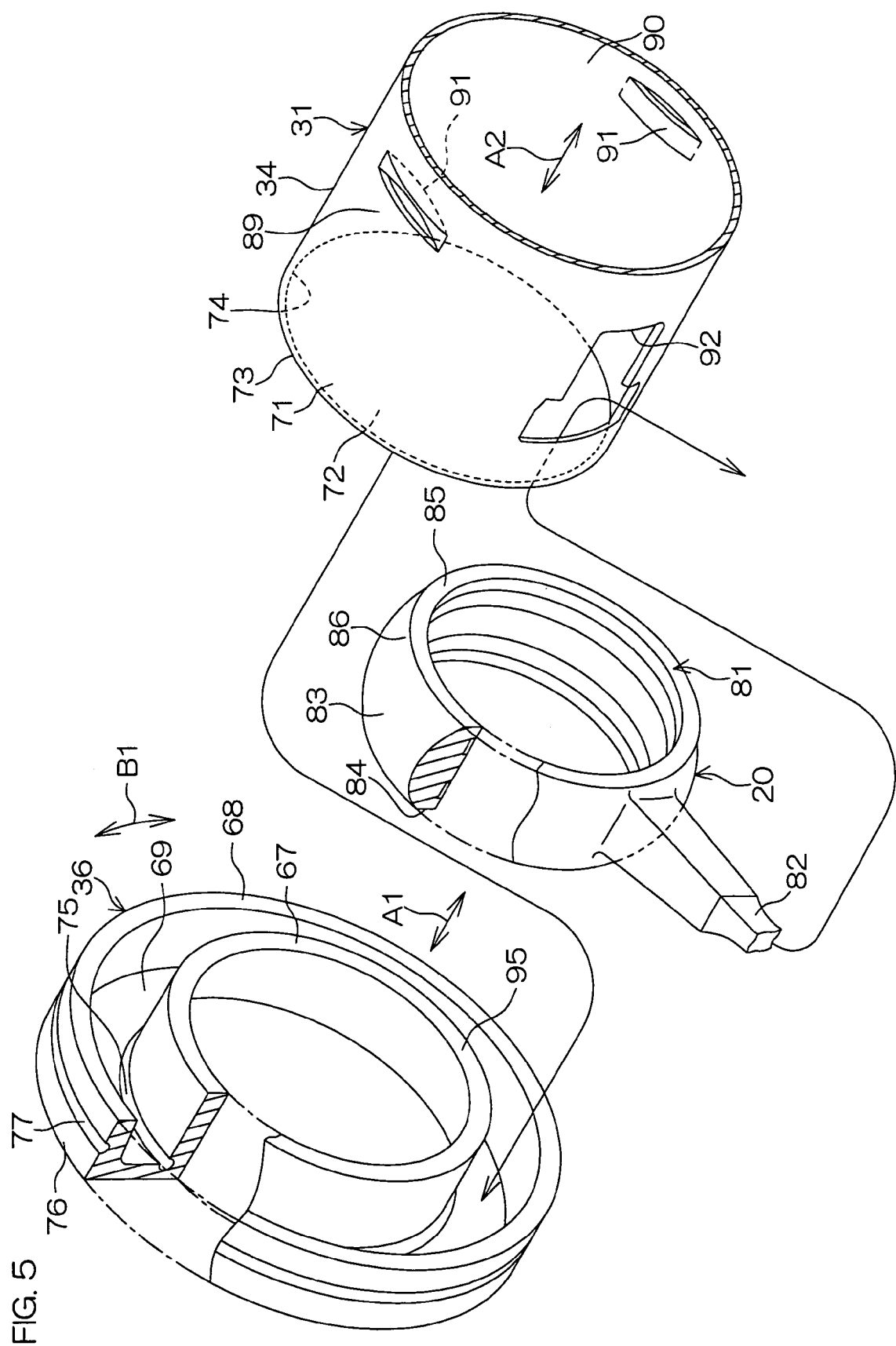
FIG. 5 is an exploded perspective view illustrating an upper housing, a torque sensor and a sensor housing which are major portions of the electric power steering system of FIG. 1.

FIG. 4 is an exploded diagram of major portions shown in FIG. 3. FIG. 5 is an exploded perspective view of major portions shown in FIG. 3. Referring to FIGS. 4 and 5, the upper housing 36 includes an inner tube 67, an outer tube 68 and an annular connection wall 69 which connects the inner tube 67 and the outer tube 68. The inner tube 67 and the outer tube 68 are disposed coaxially with each other.

Referring to FIGS. 3 and 4, the outer tube 68 is press-fitted to the inner periphery of the connection portion 64 serving as the engagement surface 65 at the upper portion of the lower housing 37. The inner tube 67 is press-fitted to an inner periphery 72 of a lower portion 71 of the sensor housing 34.

A lower end 73 of the sensor housing 34 abuts against the connection wall 69. The lower end 73 of the sensor housing 34 is annular, and has an opening 74.

The inner tube 67 has a diameter which is reduced by press-fitting the inner tube 67 to the inner periphery 72 of the lower portion 71 of the sensor housing 34. As a result, the outer ring 44 of the upper bearing 40 is tightly fitted and retained in the inner tube 67. The inner tube 67 rotatably supports the steering shaft 3 via the upper bearing 40. With the outer ring 44 tightly fitted in the inner tube 67, there is no radial gap between the outer ring 44 and the inner tube 67.

Referring to FIGS. 3 and 5, the connection wall 69 has an endless annular groove 75 extending around the inner tube 67. The lower end 73 of the sensor housing 34 is inserted in the annular groove 75 of the connection wall 69.

The outer tube 68 has one or more grooves 77 provided in an outer periphery 76 thereof as extending in the circumferential directions B1 of the steering shaft 3. The groove 77 may be an endless circumferential groove, or a closed-end groove. The groove 77 may be a spiral groove having closed ends.

Referring to FIG. 2, the electric power steering system 1 includes a magnetic circuit formation member 80 which serves, together with the input shaft 17, the output shaft 18, the torsion bar 19 and the torque sensor 20, for the detection of the steering torque. The torque sensor 20 detects the steering torque based on magnetic fluxes generated by the magnetic circuit formation member 80.

Referring to FIGS. 3, 4 and 5, the torque sensor 20 includes an annular main body 81, and a wiring 82 extending from the main body 81. The main body 81 has an outer periphery 83, and end faces 84, 85 located on opposite sides thereof defined in the axial directions A1 of the steering shaft 3. The wiring 82 extends radially outward from a part of the outer periphery 83 of the main body 81.

The outer periphery 83 of the main body 81 includes a portion 86 defined by a part of a spherical surface. The portion 86 is spaced from the wiring 82. The spherical surface defining the portion 86 has a diameter that is equal to or slightly smaller than the inner diameter of the sensor housing 34. The portion 86 is engaged with an inner periphery 90 of an upper portion 89 of the sensor housing 34.

The sensor housing 34 has a plurality of projections 91 provided as a positioning member on the inner periphery 90 of the upper portion 89 thereof. The projections 91 project radially inward from the inner periphery 90. The projections 91 are spaced from each other circumferentially of the sensor housing 34 (circumferentially (B1) of the steering shaft 3) or, for example, disposed in circumferentially equidistantly spaced relation. At least one projection 91 may be provided but, in this embodiment, two projections 91 are provided as will be described.

The two projections 91 are disposed in the same positional relation defined in the axial directions A2 of the sensor housing 34 (the axial directions A2 coincide with the axial directions A1 of the steering shaft 3), and spaced a predetermined distance from the lower end 73 of the sensor housing 34.

The sensor housing 34 has a single insertion hole 92 provided in the upper portion 89 thereof. The wiring 82 of the torque sensor 20 extends out of the sensor housing 34 through the insertion hole 92. The insertion hole 92 has a dimension L1 that is greater than a dimension L2 between the end faces 84 and 85 of the main body 81 of the torque sensor 20 (L2<L1) as measured in the axial directions A2 of the sensor housing 34.

Referring to FIG. 3, the main body 81 of the torque sensor 20 is engaged with the inner periphery 90 of the sensor housing 34. An end 95 of the inner tube 67 abuts against the end face 84 of the main body 81 of the torque sensor 20. Thus, the main body 81 of the torque sensor 20 is positioned on one side of the sensor housing 34 defined in the axial directions A2 of the sensor housing 34.

The end face 85 of the main body 81 of the torque sensor abuts against the two projections 91. The main body 81 of the torque sensor 20 is held between the end 95 of the inner tube 67 and the projections 91 serving as the positioning member. Thus, the main body 81 of the torque sensor 20 is positioned on the opposite sides of the sensor housing 34 defined in the axial directions A2 of the sensor housing 34.

The inner tube 67 has a greater length than the outer ring 44 of the upper bearing 40 as measured axially (A1) of the steering shaft 3. The outer ring 44 of the upper bearing 40 retained by the inner periphery of the inner tube 67 is spaced from the end 95 of the inner tube 67. There is a gap defined between the upper bearing 40 and the torque sensor 20 in the axial directions A1 of the steering shaft 3.

An upper portion of the insertion hole 92 defined in the axial directions A2 of the sensor housing 34 is closed by a part of the main body 81 of the torque sensor 20. Further, a lower portion of the insertion hole 92 defined in the axial directions A2 of the sensor housing 34 is closed by a part of the inner tube 67 of the upper housing 36. Thus, the insertion hole 92 is sealed.

Referring to FIG. 4, the electric power steering system 1 can be assembled, for example, in the following manner. First, a first subassembly 101 is assembled. The first subassembly 101 includes the steering shaft 3, the speed reduction mechanism 24, the lower housing 37, the upper bearing 40, the lower bearing 41, the magnetic circuit formation member 80 and the like. The first subassembly 101 is not mounted with the column tube 31, the torque sensor 20 and the upper housing 36.

Figure 6:
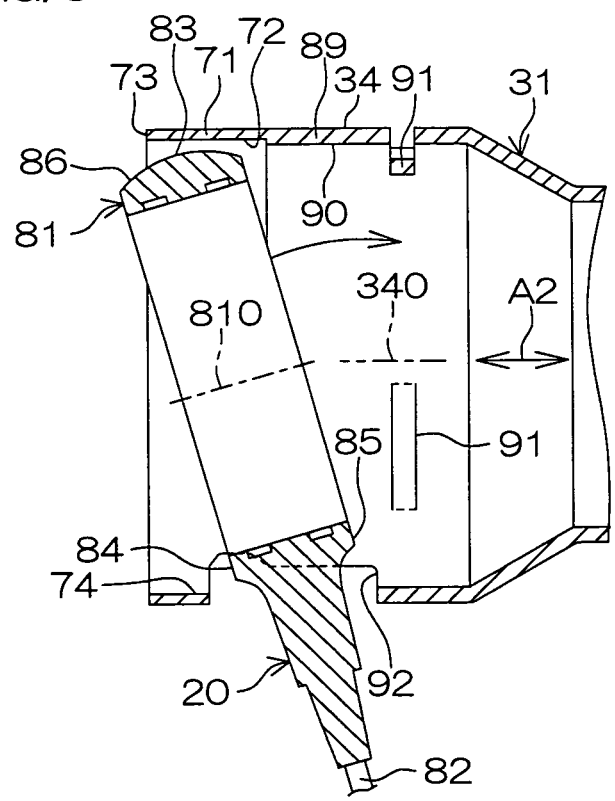
FIG. 6 is a sectional view showing the mounting of the torque sensor in the sensor housing shown in FIG. 3.
Figure 7:
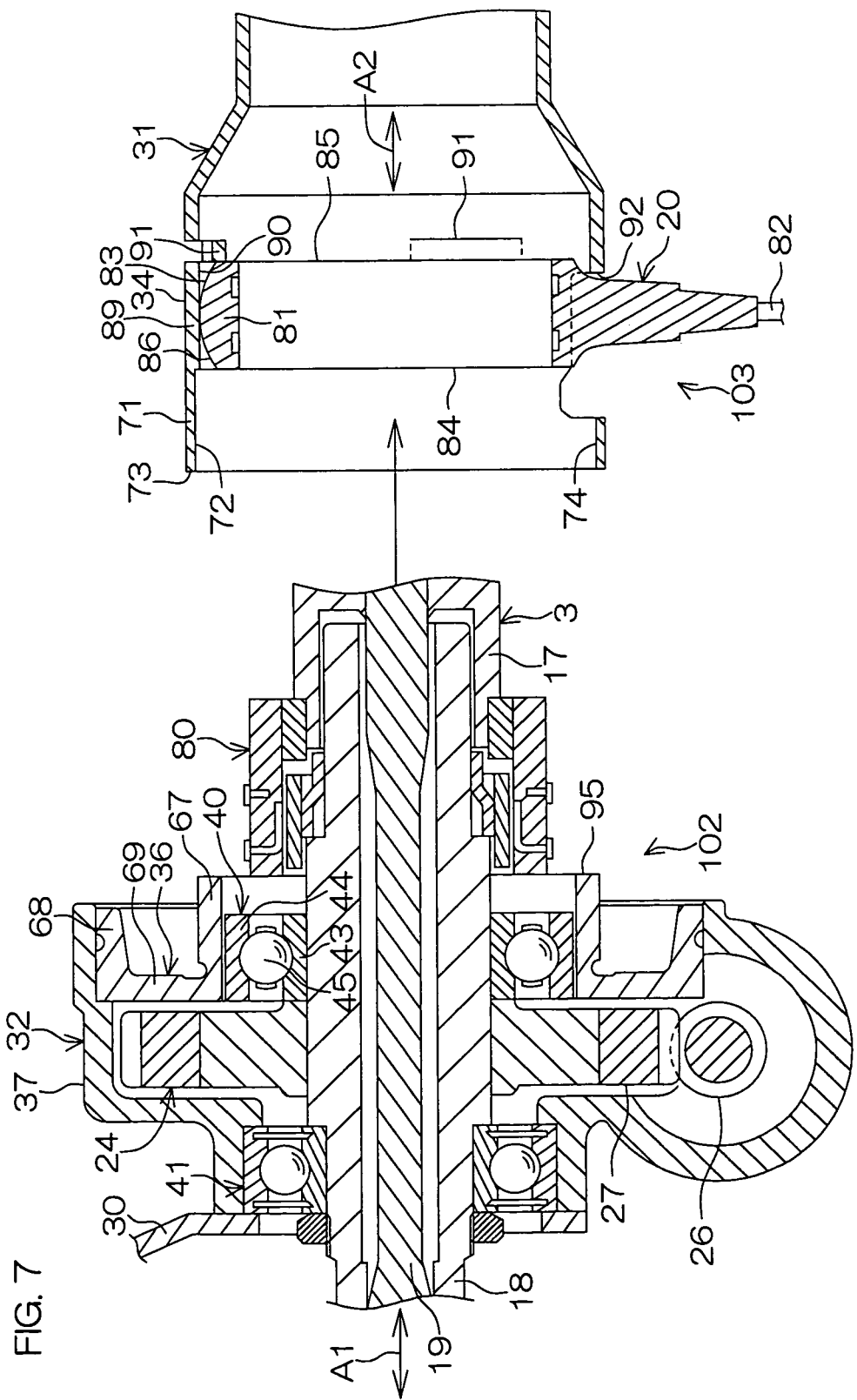
FIG. 7 is an exploded sectional view of major portions of the electric power steering system of FIG. 1, illustrating an assembling step.

FIG. 6 is a sectional view showing the mounting of the torque sensor 20 shown in FIG. 3 in the sensor housing 34. FIG. 7 is an exploded diagram of major portions shown in FIG. 3, illustrating the assembling.

Referring to FIGS. 4 and 7, the upper housing 36 is attached to the first subassembly 101. Thus, a second subassembly 102 is provided. More specifically, the outer periphery 76 of the outer tube 68 of the upper housing 36 is press-fitted to the engagement surface 65 of the connection portion 64 of the lower housing 37. At the same time, the inner periphery of the inner tube 67 of the upper housing 36 is engaged with the outer periphery of the outer ring 44 of the upper bearing 40.

Referring to FIG. 7, the inner tube 67 of the upper housing 36 of the second subassembly 102 is not engaged with the sensor housing 34 yet. In the second subassembly 102, the inner periphery of the inner tube 67 of the upper housing 36 is loosely fitted to the outer periphery of the outer ring 44 of the upper bearing 40 with the inner tube 67 being press-fitted in the lower housing 37.

Referring to FIGS. 4 and 7, the torque sensor 20 is mounted in the sensor housing 34. Thus, a third subassembly 103 is provided. The third subassembly 103 includes the sensor housing 34 and the torque sensor 20.

Referring to FIGS. 4 and 6, more specifically, the torque sensor 20 is inserted from the opening 74 at the lower end 73 of the sensor housing 34 and mounted in the sensor housing 34. At this time, the wiring 82 of the torque sensor 20 is inserted into the sensor housing 34 from the opening 74 before insertion of the main body 81. In turn, the wiring 82 is passed through the insertion hole 88. Further, the main body 81 of the torque sensor 20 is inserted into the sensor housing 34 with a center axis 810 of the main body 81 being inclined with respect to a center axis 340 of the sensor housing 34.

Thereafter, the main body 81 is turned in the sensor housing 34 to align the center axis 810 of the main body 81 with the center axis 340 of the sensor housing 34. The end face 85 of the main body 81 is brought into abutment against the two projections 91 of the sensor housing 34.

Since the dimension L1 of the insertion hole 92 is greater than the dimension L2 of the main body 81 as measured in the axial directions A2 of the sensor housing 34, it is easy to pass the wiring 82 through the insertion hole 92.

The portion 86 of the outer periphery 83 of the main body 81 is defined by a part of the spherical surface. Therefore, when the main body 81 is turned in the sensor housing 34, edges (corresponding to corner portions) defined between the end faces 84, 85 and the outer periphery 83 of the main body 81 do not interfere with the inner periphery 90 of the sensor housing 34. Therefore, the main body 81 is easily turned in the sensor housing 34.

Referring to FIG. 7, the third subassembly 103 is combined with the second subassembly 102. Thus, a product is provided in a state shown in FIG. 3. The assembling of the second subassembly 102 may precede or follow the assembling of the third subassembly 103, or may be simultaneous with the assembling of the third subassembly 103.

Referring to FIGS. 3 and 7, more specifically, the outer periphery of the inner tube 67 is press-fitted to the inner periphery 72 of the lower portion 71 of the sensor housing 34. Thus, the diameter of the inner tube 67 is reduced. As a result, the inner periphery of the inner tube 67 and the outer periphery of the outer ring 44 of the upper bearing 40 are engaged with each other without a gap therebetween.

Therefore, the steering shaft 3 is positioned at the center of the inner periphery of the inner tube 67 of the upper housing 36 via the upper bearing 40. Further, the upper housing 36 and the lower housing 37 are brought into press-fit engagement with each other and, therefore, disposed coaxially with each other. Accordingly, the lower housing 37 and the steering shaft 3 are disposed coaxially with each other via the upper housing 36 and the upper bearing 40. In this state, the lower bearing 41 is fixed to the lower housing 37, whereby the steering shaft 3 is positioned coaxially with the lower housing 37 via the lower bearing 41.

Figure 8:
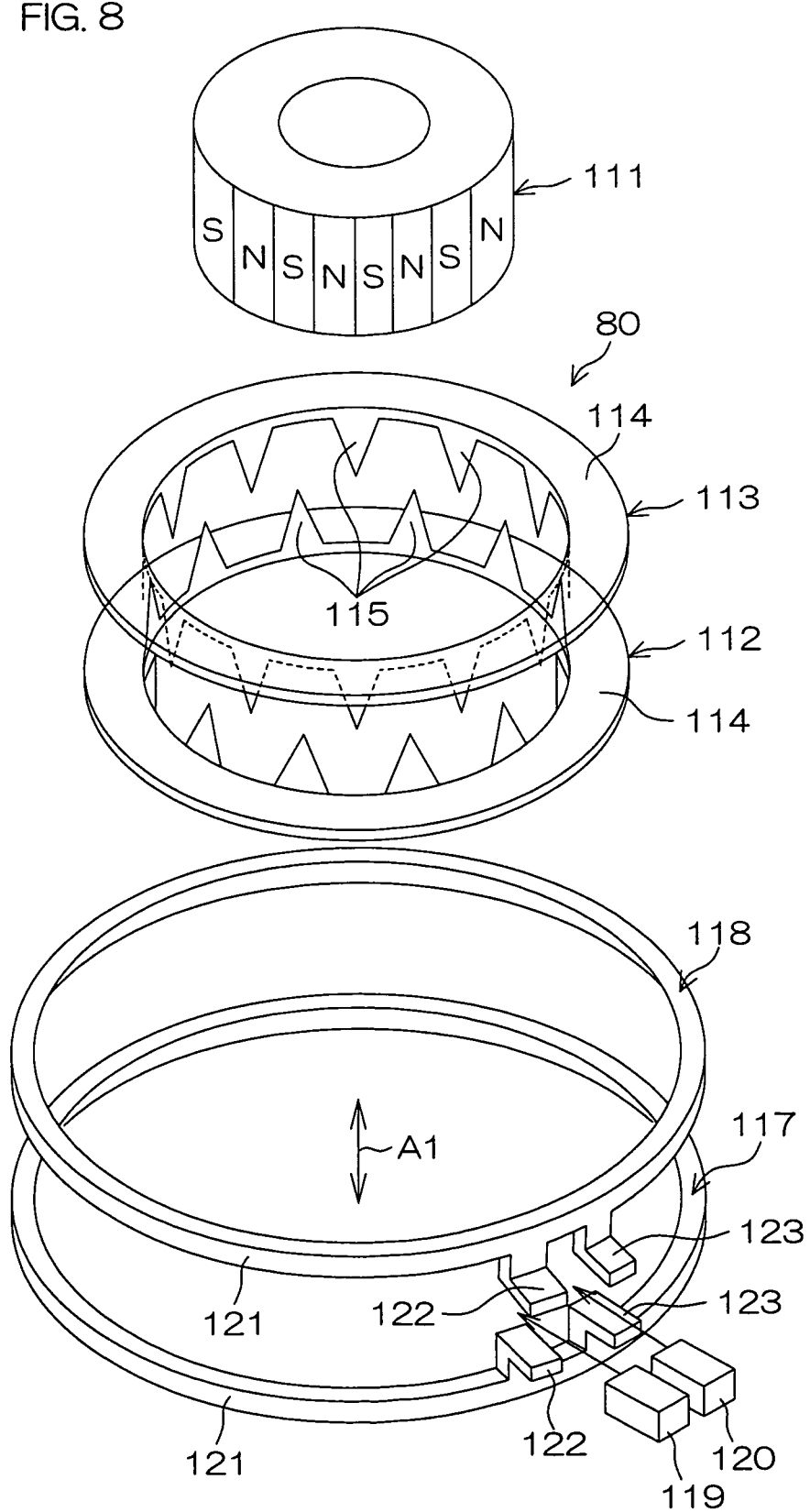
FIG. 8 is an exploded diagram of the torque sensor and a magnetic circuit formation member.

FIG. 8 is an exploded perspective view of major portions of the torque sensor 20 and the magnetic circuit formation member 80. Referring to FIGS. 3 and 8, the magnetic circuit formation member 80 includes an annular permanent magnet 111, and first and second annular magnetic yokes 112, 113 each serving as a soft magnetic member.

The permanent magnet 111 has a cylindrical shape, and is coaxially fixed to the output shaft 18 for co-rotation. The permanent magnet 111 has a plurality of magnetic poles, e.g., 24 magnetic poles, provided on an outer periphery thereof. These magnetic poles include the same numbers of N-poles and S-poles (12 N-poles and 12 S-poles). The N-poles and the S-poles are alternately and equidistantly arranged circumferentially of the permanent magnet 111.

The first and second magnetic yokes 112, 113 are retained in a retention member made of a synthetic resin material. In this state, the first and second magnetic yokes 112, 113 are fixed to the input shaft 17.

Alternatively, the permanent magnet 111 may be fixed to the input shaft 17, and the first and second magnetic yokes 112, 113 may be fixed to the output shaft 18.

The first and second magnetic yokes 112, 113 each include an annular disk plate 114, and a plurality of claws 115 equidistantly arranged as projecting from an inner peripheral edge of the annular plate 114. The claws 115 are provided in the same number as the N-poles or the S-poles of the permanent magnet 111. For example, the number of the claws is 12.

The annular plates 114 of the first and second magnetic yokes 112, 113 are disposed coaxially with each other to be opposed to and spaced a predetermined distance from each other in the axial directions A1 of the steering shaft 3. The claws 115 of one of the first and second magnetic yokes 112, 113 project toward the other magnetic yoke, and are offset from the claws 115 of the other magnetic yoke circumferentially of the annular plates 114 so as to be alternately and evenly arranged.

The first and second magnetic yokes 112, 113 are fixed with respect to each other in a noncontact state. The first and second magnetic yokes 112, 113 surround the permanent magnet 111 in a noncontact state at positions radially outward of the steering shaft 33. The first and second magnetic yokes 112, 113 are disposed in a magnetic field generated by the permanent magnet 111 to be thereby magnetically coupled to the permanent magnet 111. Thus, the permanent magnet 111 and the first and second magnetic yokes 112, 113 define a magnetic circuit.

The torque sensor 20 includes first and second magnetic flux concentrating rings 117, 118 as soft magnetic members for concentrating the magnetic fluxes generated in the magnetic circuit formation member 80, first and second magnetic sensors 119, 120 which detect the steering torque based on the densities of the concentrated magnetic fluxes, a circuit board (not shown) electrically connected to the first and second magnetic sensors 119, 120, the wiring 82 electrically connected to the circuit board, and the main body 81. The wiring 82 includes a plurality of electric cables.

In this embodiment, the main body 81 is formed of an insulative synthetic resin material. The main body 81 retains the first and second magnetic flux concentrating rings 117, 118, the first and second magnetic sensors 119, 120, the circuit board and a part of the wiring 82 in an embedded state to fix these components with respect to each other.

The first and second magnetic flux concentrating rings 117, 118 each include an annular major portion 121 and a pair of claws 122, 123 serving as magnetic flux concentrating projections. The claws 122, 123 extend radially outward from the major portion 121.

The first and second magnetic flux concentrating rings 117, 118 are respectively magnetically coupled to the first and second magnetic yokes 112, 113. Further, the first and second magnetic flux concentrating rings 117, 118 are magnetically coupled to each other. A distance between the claws 122 and a distance between the claws 123 are smaller than a distance between the major portions 121. Thus, the first and second magnetic flux concentrating rings 117, 118 can introduce the magnetic fluxes generated between the first and second magnetic yokes 112, 113 to spaces defined between the opposed claws 122 and between the opposed claws 123.

The first magnetic sensor 119 is disposed between the opposed claws 122. The second magnetic sensor 120 is disposed between the other opposed claws 123. The first and second magnetic sensors 119, 120 each include a Hall IC. Though not shown, the Hall IC includes a Hall element serving as a detector, and a cover covering the detector. The detector is electrically connected to the circuit board. The circuit board includes electric components mounted on a wiring board. The circuit board functions as a power source and a signal processing section for the first and second magnetic sensors 119, 120.

The torque sensor 20 detects the steering torque in the following manner. In a neutral state with no torque acting between the input shaft 17 and the output shaft 18, distal tips of the respective claws 115 of the first and second magnetic yokes 112, 113 each points a boundary between the N-pole and the S-pole of the permanent magnet 111. At this time, no magnetic flux is generated between the first and second magnetic yokes 112 and 113.

When a torque acts between the input shaft 17 and the output shaft 18, the shafts 17 and 18 are angularly shifted from each other. The magnetic fluxes are correspondingly generated between the first and second magnetic yokes 112 and 113. The magnetic fluxes generated at this time change according to a relative rotational angle of the shafts 17, 18.

The magnetic fluxes generated between the first and second magnetic yokes 112, 113 are introduced to the spaces defined between the opposed claws 122 and between the opposed claws 123 of the first and second magnetic flux concentrating rings 117, 118, and leaked to the spaces between the opposed claws 122 and between the opposed claws 123. The densities of the leaked magnetic fluxes are detected by the first and second magnetic sensors 119, 120.

Referring to FIG. 2, as described above, the electric power steering system 1 according to this embodiment includes the following components (1) to (6): (1) the column tube 31 which rotatably supports the steering shaft 3 coupled to the steering member 2 and is fixed to the vehicle body 12; (2) the tubular sensor housing 34 provided by increasing the diameter of the lower portion of the column tube 31; (3) the torque sensor 20 accommodated in the sensor housing 34 for detecting the steering torque; (4) the speed reduction mechanism 24 including the worm 26 and the worm wheel 27 for transmitting the rotation of the steering assist electric motor 23 to the steering shaft 3; (5) the gear housing 32 which accommodates the speed reduction mechanism 24; and (6) the upper bearing 40 and the lower bearing 41 disposed on the upper and lower sides of the worm wheel 27 and rotatably supporting the steering shaft 3. The gear housing 32 includes the tubular lower housing 37 which rotatably supports the steering shaft 3 via the lower bearing 41, and the upper housing 36. The upper housing 36 includes the inner tube 67, the outer tube 68, and the annular connection wall 69 connecting the inner tube 67 and the outer tube 68. The outer tube 68 is press-fitted to the engagement surface 65 (inner periphery) of the connection portion 64 (upper portion) of the lower housing 37. The inner tube 67 rotatably supports the steering shaft 3 via the upper bearing 40. The diameter of the inner tube 67 is reduced by press-fitting the inner tube 67 to the inner periphery 72 of the lower portion 71 of the sensor housing 34. As a result, the outer ring 44 of the upper bearing 40 is tightly fitted and supported in the inner tube 67.

According to this embodiment, the upper housing 36, the lower housing 37 and the upper bearing 40 can be positioned coaxially with each other at their center positions, so that the offset of the center positions of the upper bearing 40 and the lower bearing 41 can be minimized. This suppresses the occurrence of the abnormal noise which may otherwise occur due to the offset of the center positions.

The positioning of the upper housing 36, the lower housing 37 and the upper bearing 40 is achieved by the press-fitting which does not require special skill, thereby facilitating the assembling. As a result, the production costs can be further reduced.

In the assembling, for example, the upper bearing 40 can be easily attached to the inner tube 67 before the diameter of the inner tube 67 is reduced by press-fitting the inner tube 67 in the sensor housing 34. As a result, the production costs can be further reduced.

Referring to FIG. 3, the torque sensor 20 includes the annular main body 81 engaged with the inner periphery 90 of the sensor housing 34 in this embodiment. With the end 95 of the inner tube 67 in abutment against the end face 84 of the main body, 81 of the torque sensor 20, the torque sensor 20 is positioned in the axial directions A2 of the sensor housing 34. In this case, the inner tube 67 can be used for the positioning of the main body 81 of the torque sensor 20, further reducing the production costs.

In this embodiment, the sensor housing 34 is formed with the projections 91 projecting inward thereof. The main body 81 of the torque sensor 20 is held between the end 95 of the inner tube 67 and the projections 91. In this case, the projections 91 for the positioning of the main body 81 of the torque sensor 20 are provided as parts of the sensor housing 34, so that the number of the components can be reduced. This further reduces the production costs.

In this embodiment, the torque sensor 20 includes the wiring 82 extending from a part of the outer periphery 83 of the annular main body 81. The sensor housing 34 has the insertion hole 92 through which the wiring 82 extends out of the sensor housing 34. The outer periphery 83 of the main body 81 includes the portion 86 defined by a part of the spherical surface.

In this case, the torque sensor 20 unitarily including the main body 81 and the wiring 82 is inserted into the sensor housing 34 from the opening 74 at the axial end of the sensor housing, 34, for example, during the assembling. At this time, the main body 81 of the torque sensor 20 is turned in the sensor housing 34 with the wiring 82 of the torque sensor 20 passed through the insertion hole 92, whereby the main body 81 and the sensor housing 34 are disposed coaxially with each other. The spherical surface of the outer periphery 83 of the main body 81 does not interfere with the inner periphery 90 of the sensor housing 34 during the turning, thereby facilitating the operation.

In this embodiment, the size of the insertion hole 92 of the sensor housing 34 can be reduced to a size such as to permit the passage of the wiring 82, as compared with a case in which the main body of the torque sensor is axially mounted in the sensor housing through the insertion hole of the sensor housing. For example, the insertion hole 92 has a circumferential dimension that is less than half the circumference of the sensor housing 34. This suppresses reduction in the strength of the sensor housing 34, which may otherwise occur due to the presence of the insertion hole 92. Since an inexpensive thinner-wall member or an inexpensive lower-strength member can be used for the sensor housing 34, the production costs can be further reduced.

In this embodiment, the torque sensor 20 includes the wiring 82 extending from a part of the outer periphery 83 of the annular main body 81. The sensor housing 34 has the insertion hole 92 through which the wiring 82 extends out of the sensor housing 34. The insertion hole 92 is sealed with the inner tube 67 and the main body 81 of the torque sensor 20.

In this case, it is possible to prevent foreign matter from intruding into the sensor housing 34 from the outside through the insertion hole 92. In addition, the inner tube 67 and the main body 81 of the torque sensor 20 are used for the sealing of the insertion hole 92, thereby simplifying or obviating a sealing member to be used besides these components. This makes it possible to simplify the construction, thereby reducing the production costs.

Further, the size of the insertion hole 92 can be increased to be greater than the size of the main body 81 of the torque sensor 20 as measured in the axial directions A2 of the sensor housing 34. This further facilitates the mounting of the torque sensor 20 in the sensor housing 34.

In this embodiment, the connection wall 69 is provided with the annular groove 75 extending around the inner tube 67, and the lower end 73 of the sensor housing 34 is inserted in the annular groove 75.

In this case, the provision of the annular groove 75 prevents formation of a concavely curved fillet portion between the connection wall 69 and the inner tube 67. Therefore, the lower end 73 of the sensor housing 34 is prevented from riding on the fillet portion. Further, the press-fitting depth of the sensor housing 34 is prevented from varying from system to system due to the ride-on. Further, the radial press-fitting overlap of the sensor housing 34 is less liable to vary from system to system.

In this embodiment, the outer tube 68 has the groove 77 provided in the outer periphery 76 thereof as extending circumferentially thereof. In this case, when a lubricant present in the gear housing 32 is liable to move in the axial directions A1 of the steering shaft 3 on the outer periphery 76 of the outer tube 68, the groove 77 suppresses the movement of the lubricant. As a result, the lubricant is substantially prevented from leaking outside the gear housing 32 through a gap between the outer periphery 76 of the outer tube 68 and the inner periphery of the upper portion of the lower housing 37.

A modification of this embodiment is conceivable as will be described below. In the following, differences from the above embodiment will be mainly described. The other arrangement is the same as that of the above embodiment, so that duplicate description will be omitted.

Figure 9:
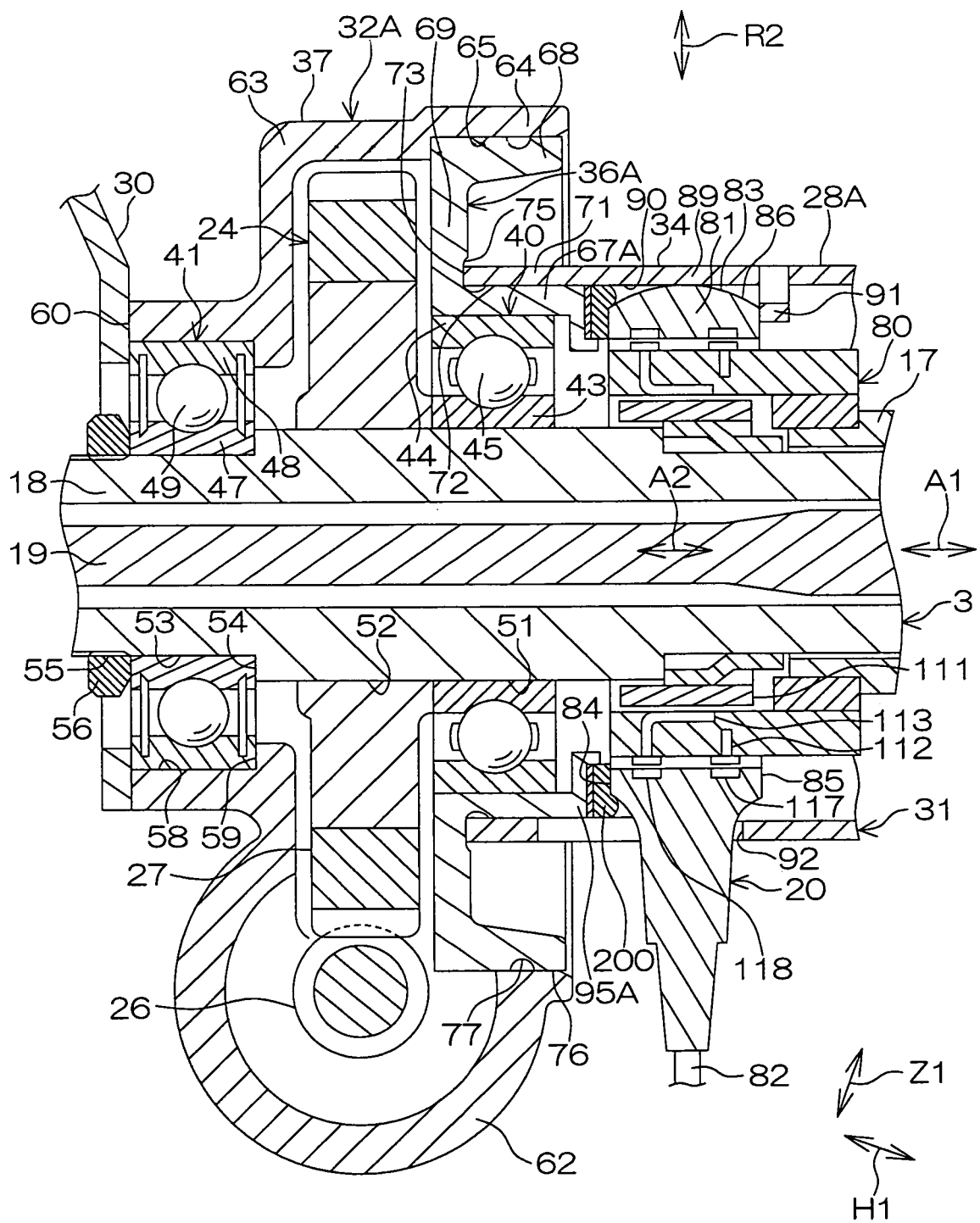
FIG. 9 is a sectional view illustrating, on an enlarged scale, major portions of an electric power steering system according to a second embodiment of the present invention.
Figure 10:
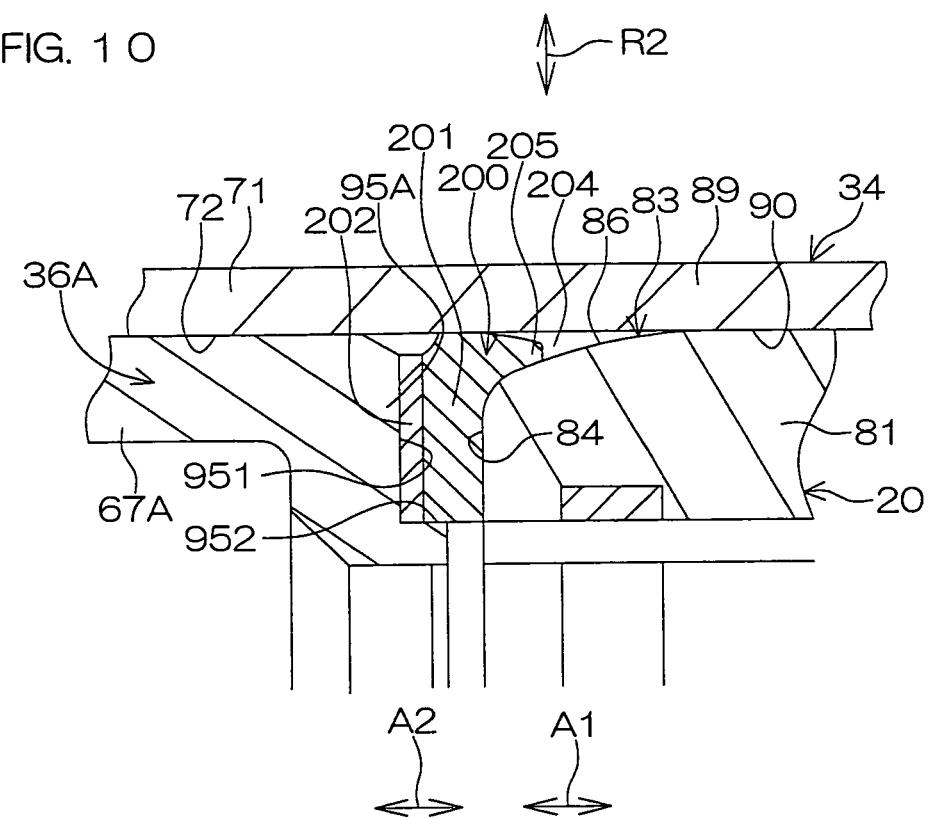
FIG. 10 is an enlarged view of major portions of the electric power steering system of FIG. 9.

For example, FIG. 9 is a sectional view of major portions of an electric power steering system 1 according to a second embodiment of the present invention. FIG. 10 is an enlarged sectional view of the major portions. In the embodiment shown in FIG. 9, a steering column 28A, a gear housing 32A, an upper housing 36A, an inner tube 67A and an end 95A are provided instead of the corresponding components provided in the first embodiment, i.e., the steering column 28, the gear housing 32, the upper housing 36, the inner tube 67 and the end 95, respectively. These components differ from the corresponding components provided in the first embodiment in the following manner, and the other arrangement is the same as in the above embodiment.

Referring to FIG. 9, an annular spacer 200 is provided between the end 95A of the inner tube 67A of the upper housing 36A located on an axially (A1) upper side and the end face 84 of the main body 81 of the torque sensor 20 in this embodiment.

Referring to FIGS. 9 and 10, with the provision of the spacer 200, the end 95A of the inner tube 67A of the upper housing 36A is configured so as to retain the spacer 200 in this embodiment. That is, the end 95A of the inner tube 67A located on the axially (A1) upper side has a receiving portion 951 which receives the spacer 200 in the axial directions A1, and a positioning portion 952 which positions the spacer 200 radially of the upper housing 36a. The positioning portion 952 is defined by an annular step.

The spacer 200 and the main body 81 of the torque sensor 20 are arranged in the axial directions A1 in this order, and held between the end 95A of the inner tube 67A and the projections 91 of the sensor housing 34.

The spacer 200 includes an annular resilient member 201, and an annular metal core 202 to which the resilient member 201 is fixed. The resilient member 201 abuts against the end face 84 of the main body 81 of the torque sensor 20. The metal core 202 is retained by the receiving portion 951 and the positioning portion 952 at the end 95A of the inner tube 67A. More specifically, the metal core 202 is fixed in abutment against the receiving portion 951 and the positioning portion 952 at the end 95A of the inner tube 67A.

The resilient member 201 is annular, and is formed of a rubber material such as chloroprene rubber (CR). The resilient member 201 is bonded to the metal core 202 by vulcanization. The resilient member 201 is axially resiliently compressed when being disposed between the main body 81 of the torque sensor 20 and the inner tube 67A of the upper housing 36A. Thus, the resilient member 201 resiliently biases the main body 81 of the torque sensor 20 toward the projections 91 as the positioning member of the sensor housing 34. As a result, the main body 81 of the torque sensor 20 is always positioned in the axial directions A2 of the sensor housing 34 even if any of the components has a dimensional error.

Figure 11:
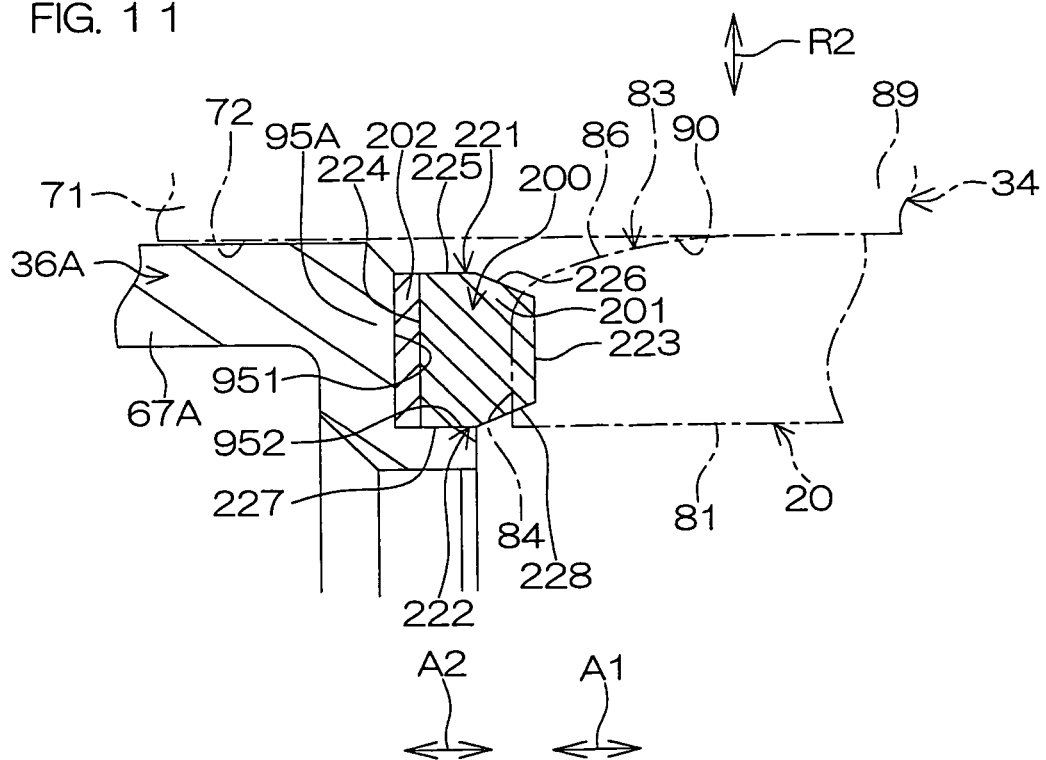
FIG. 11 is a sectional view of a spacer and an upper housing shown in FIG. 10 with a resilient member of the spacer being not restricted, wherein a sensor housing and a torque sensor combined with each other are indicated by a one-dot-and-dash line.

FIG. 11 is a sectional view of the spacer 200 and the upper housing shown in FIG. 10 with the resilient member 201 of the spacer 200 being in a free state. The sensor housing 34 and the torque sensor 20 combined with each other are indicated by a one-dot-and-dash line. Referring to FIG. 11, the resilient member 201 is tapered in the axial directions A1 toward the torque sensor 20 as seen in section in the free state.

More specifically, the resilient member 201 has a sectional shape such that corners of a rectangle are chamfered when it is in the free state. The resilient member 201 has an outer peripheral surface 221, an inner peripheral surface 222, a pair of end faces 223 and 224 opposed to each other in the axial directions A1. The outer peripheral surface 221 has a cylindrical surface 225, and a first conically tapered surface 226 as a chamfer. The inner peripheral surface 222 has a cylindrical surface 227, and a second conically tapered surface 228 as a chamfer. Since the resilient member 201 is tapered as described above, the resilient member 201 can easily deform when being resiliently compressed. As a result, the main body 81 of the torque sensor 20 is prevented from being subjected to an excessively great load.

This embodiment provides the following effects in addition to the effects provided by the first embodiment. The spacer 200 present between the end 95A of the inner tube 67A of the upper housing 36A and the end face 84 of the main body 81 of the torque sensor 20 includes the annular resilient member 201 resiliently compressed in the axial directions A1, and the spacer 200 and the main body 81 of the torque sensor 20 are held between the end 95A of the inner tube 67A and the projections 91 of the sensor housing 34.

In this case, the resilient member 201 deforms to accommodate the variations in the dimensions of the sensor housing 34, the torque sensor 20, the inner tube 67A of the upper housing 36A and other components as measured in the axial directions A1. As a result, the torque sensor 20 can be stably retained for a longer period of time.

In this embodiment, the spacer 200 includes the annular metal core 202 to which the resilient member 201 is fixed. In this case, the metal core 202 suppresses excessive deformation of the resilient member 201. This prevents the resilient member 201 of the spacer 200 from being improperly mounted when the electric power steering system 1 is assembled.

Where the spacer to be used does not include the metal core, for example, there is a possibility that a part of the resilient member of the spacer is inadvertently deformed during the mounting of the spacer, resulting in improper mounting of the spacer. In addition, it is difficult to find the improper mounting after the assembling. On the other hand, this embodiment reliably prevents the improper mounting, because the spacer has the metal core 202.

In this embodiment, as shown in FIG. 10, a space 204 is provided between a part (e.g., an end portion in the axial directions A1) of the outer periphery 83 of the main body 81 of the torque sensor 20 and the inner periphery 90 of the sensor housing 34. An excess portion 205 as a part of the resilient member 201 is resiliently compressed in the radial directions R2 of the sensor housing 34 and, in this state, accommodated in the space 204. In this case, the torque sensor 20 can be stably supported in the radial directions R2. Particularly, the main body 81 of the torque sensor 20 can be reliably disposed coaxially with the inner periphery 90 of the sensor housing 34. The excess portion 205 herein means a portion of the resilient member 201 which protrudes outward radially (R2) of the main body 81 when the resilient member 201 is compressed in the axial directions A1 to be deformed.

Figure 12:
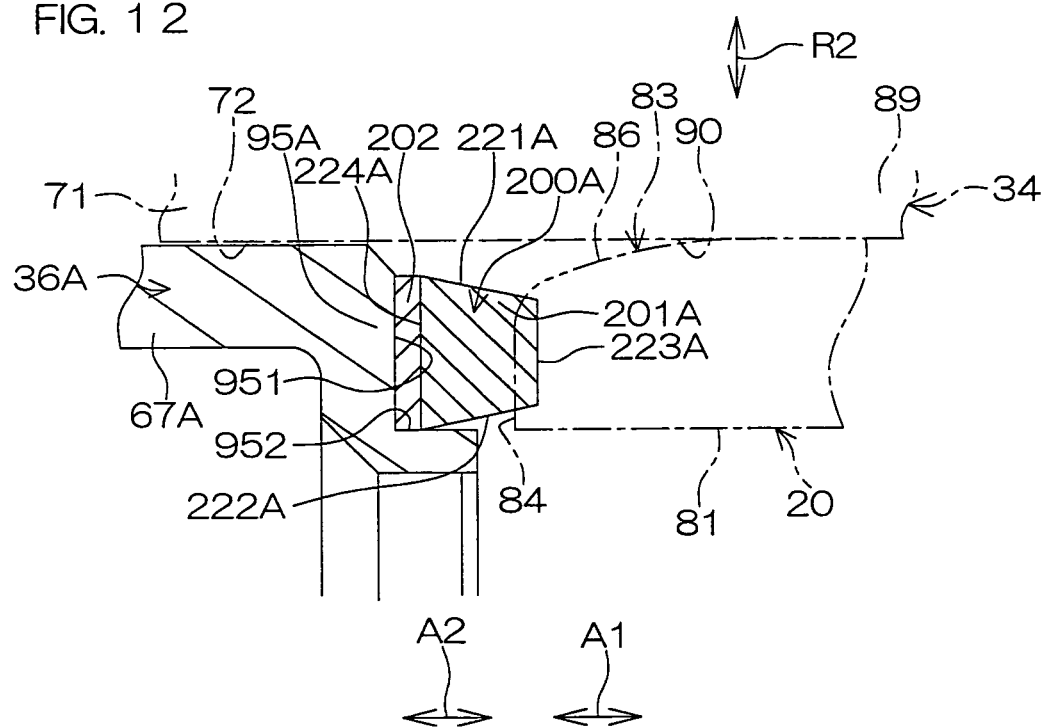
FIG. 12 is a sectional view of a spacer according to a modification and an upper housing with a resilient member of the spacer being not restricted, wherein a sensor housing and a torque sensor combined with each other are indicated by a one-dot-and-dash line.

FIG. 12 is a sectional view of a spacer 200A according to a modification and the upper housing with a resilient member 201A of the spacer 200A being in a free state. The sensor housing 34 and the torque sensor 20 combined with each other are also indicated by a one-dot-and-dash line. In the modification shown in FIG. 12, the spacer 200A including the resilient member 201A is provided instead of the spacer 200A including the resilient member 201A provided in the second embodiment shown in FIG. 11. The modification differs from the second embodiment in the following manner, and the other arrangement is the same as in the second embodiment.

Referring to FIG. 12, the spacer 200A includes the resilient member 201A and a metal core 202. The resilient member 201A has a trapezoidal sectional shape tapered in the axial directions A1 toward the torque sensor 20 when it is in a free state before being mounted. The resilient member 201A has an outer peripheral surface 221A conically tapered, an inner peripheral surface 222A conically tapered, and a pair of end faces 223A, 224A opposed to each other in the axial directions A1.

Figure 13:
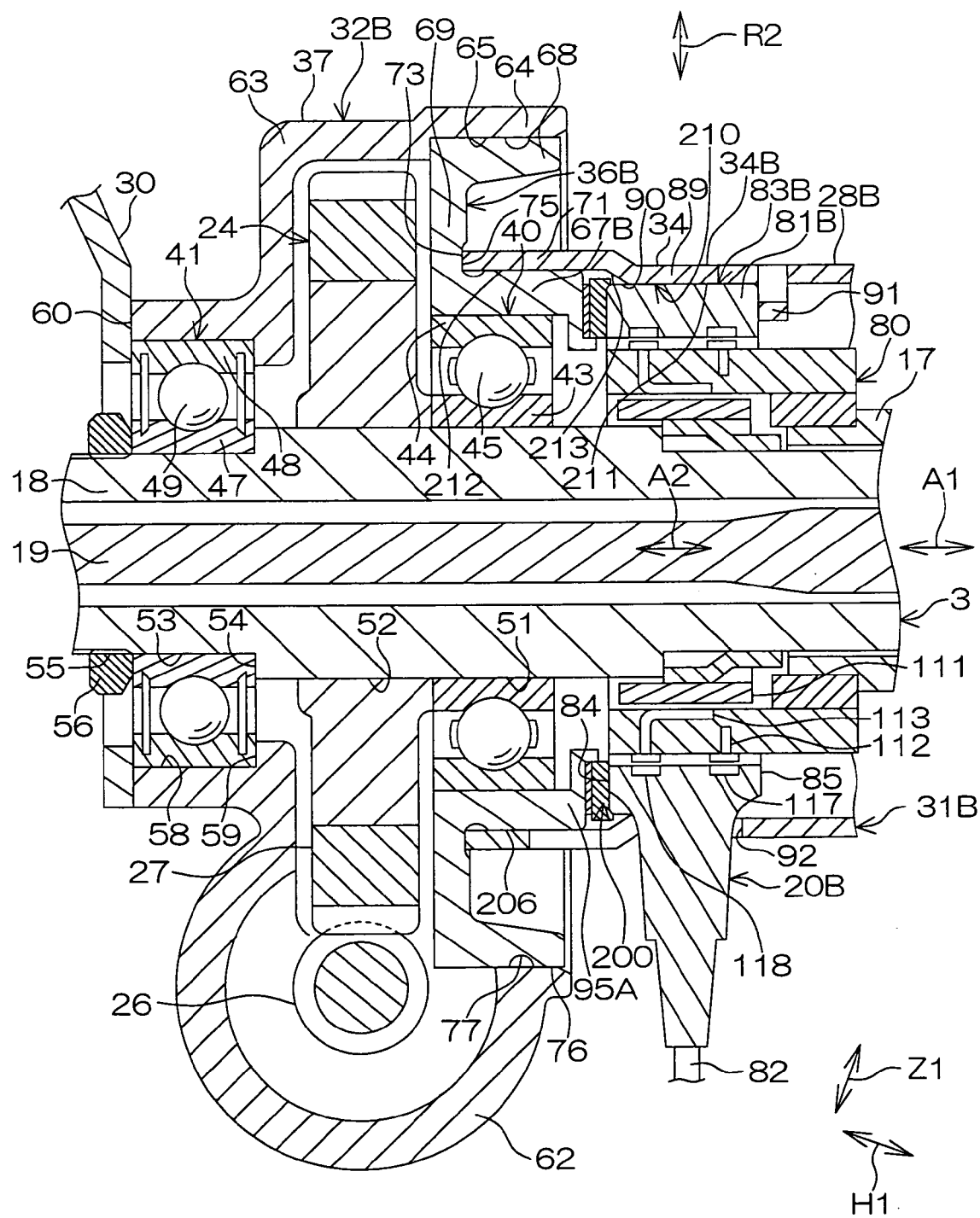
FIG. 13 is a sectional view of major portions of an electric power steering system according to a third embodiment of the present invention.

FIG. 13 is a sectional view of major portions of an electric power steering system 1 according to a third embodiment of the present invention. In the embodiment shown in FIG. 13, a steering column 28B, a gear housing 32B, an upper housing 36B, an inner tube 67B, a column tube 31B, a sensor housing 34B, a torque sensor 20B and a main body 81B are provided instead of the corresponding components provided in the second embodiment shown in FIG. 9, i.e., the steering column 28A, the gear housing 32A, the upper housing 36A, the inner tube 67A, the column tube 31, the sensor housing 34, the torque sensor 20 and the main body 81, respectively. The above components provided in this embodiment differ from the corresponding components provided in the first embodiment in the following manner, and the other arrangement is the same as in the first embodiment.

In this embodiment, a spacer 200 is provided as in the second embodiment. Further, the upper housing 36B includes the inner tube 67B. The inner tube 67B has an outer periphery 206 that is configured in conformity with an inner periphery 210 of the sensor housing 34B. In this regard, the inner tube 67B differs from the inner tube 67A, and the other arrangement is the same as that of the inner tube 67A.

Further, the inner tube 67B has an end 95A. The spacer 200 is attached to the end 95A.

Referring to FIG. 13, the sensor housing 34B has two steps. The inner periphery 210 of the sensor housing 34B includes a first greater diameter portion 211, and a second greater diameter portion 212 having a greater diameter than the first greater diameter portion 211. The first greater diameter portion 211 and the second greater diameter portion 212 are connected to each other by a tapered connection portion 213. The first greater diameter portion 211 is located at an upper position in the axial directions A1, and the second greater diameter portion 212 is located at an lower position in the axial directions A1. The first greater diameter portion 211, the second greater diameter portion 212 and the connection portion 213 are disposed coaxially with each other.

The first greater diameter portion 211 is defined by an inner periphery of an upper portion 89 of the sensor housing 34B in the axial directions A2. An outer periphery 83B of the main body 81B of the torque sensor 20B is engaged with the first greater diameter portion 211. A plurality of projections 91 are provided as a positioning member on the first greater diameter portion 211.

The second greater diameter portion 212 is defined by an inner periphery of a lower portion 71 of the sensor housing 34B in the axial directions A2. The outer periphery 206 of the inner tube 67B of the upper housing 36B is press-fitted to the second greater diameter portion 212.

The connection portion 213 connects an axially (A1) lower edge of the first greater diameter portion 211 and an axially (A1) upper edge of the second greater diameter portion 212. The connection portion 213 is tapered to be inclined with respect to the axis A1, and is capable of guiding the main body 81B of the torque sensor 20B into the first greater diameter portion 21 for engagement.

The sensor housing 34B has an insertion hole 92 which includes an elongated hole extending from the first greater diameter portion 211 to the second greater diameter portion 212.

Figure 14:
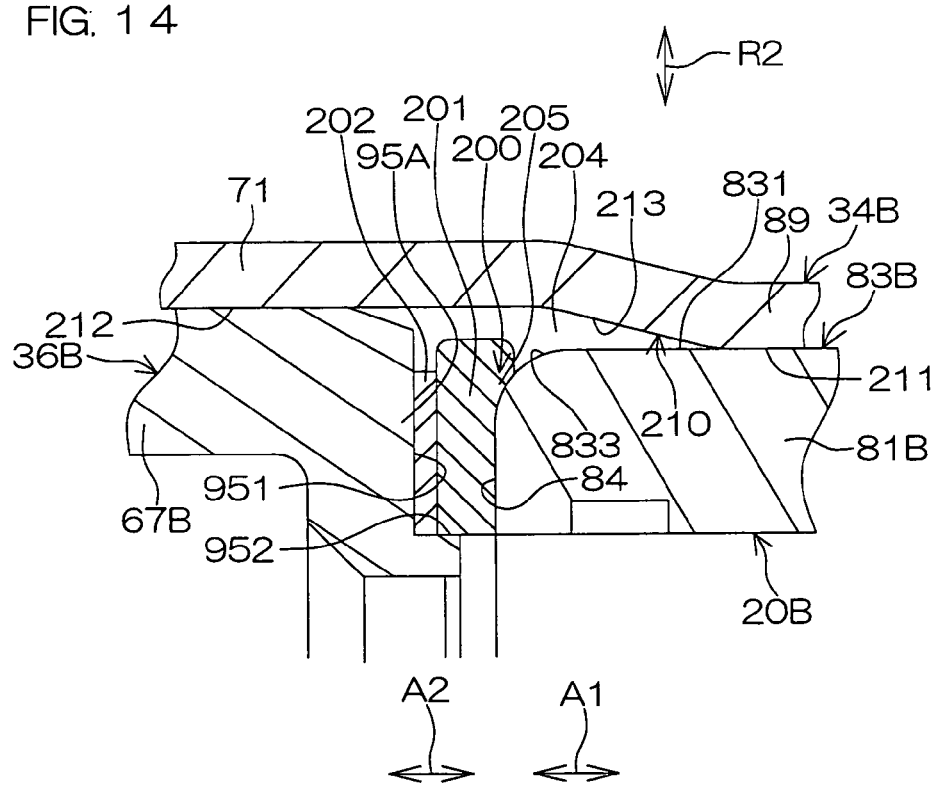
FIG. 14 is an enlarged sectional view of major portions of the electric power steering system of FIG. 13.

FIG. 14 is an enlarged sectional view of major portions of the electric power steering system 1. Referring to FIGS. 13 and 14, an annular spacer 200 is present between the end 95A of the inner tube 67B of the upper housing 36B and an end face 84 of the main body 81B of the torque sensor 20B. The main body 81B of the torque sensor 20B and the spacer 200 are held between the end 95A of the inner tube 67B and the projections 91 serving as the positioning member. The spacer 200 includes an annular resilient member 201 and an annular metal core 202.

The resilient member 201 is resiliently compressed in the axial directions A1. In this state, an excess portion 205 of the resilient member 201 is accommodated in a space 204 defined between a part of the outer periphery 83B of the main body 81B of the torque sensor 20B and the inner periphery 210 of the sensor housing 34B. The excess portion 205 of the resilient member 201 accommodated in the space 204 may be configured so as not to be restricted by the sensor housing 34B (as shown in FIG. 14), or may be configured so as to be restricted by the sensor housing 34B. In the latter case, the excess portion 205 is resiliently compressed radially (R2) inward by the sensor housing 34B.

Figure 15:
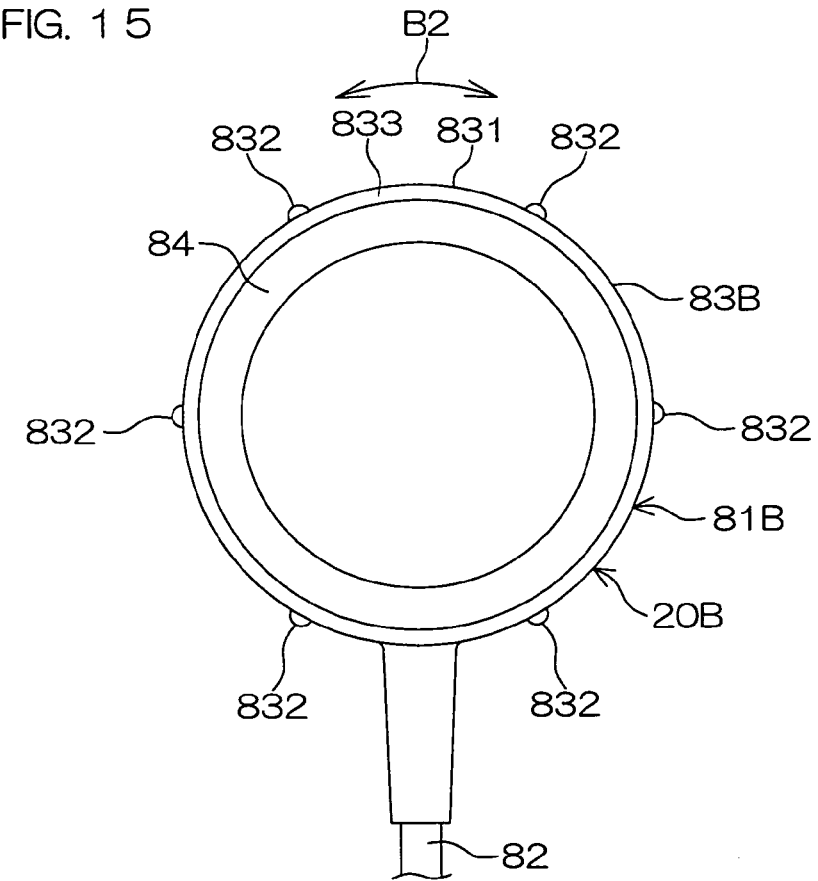
FIG. 15 is a side view of a main body of a torque sensor shown in FIG. 13 as seen axially.
Figure 16:
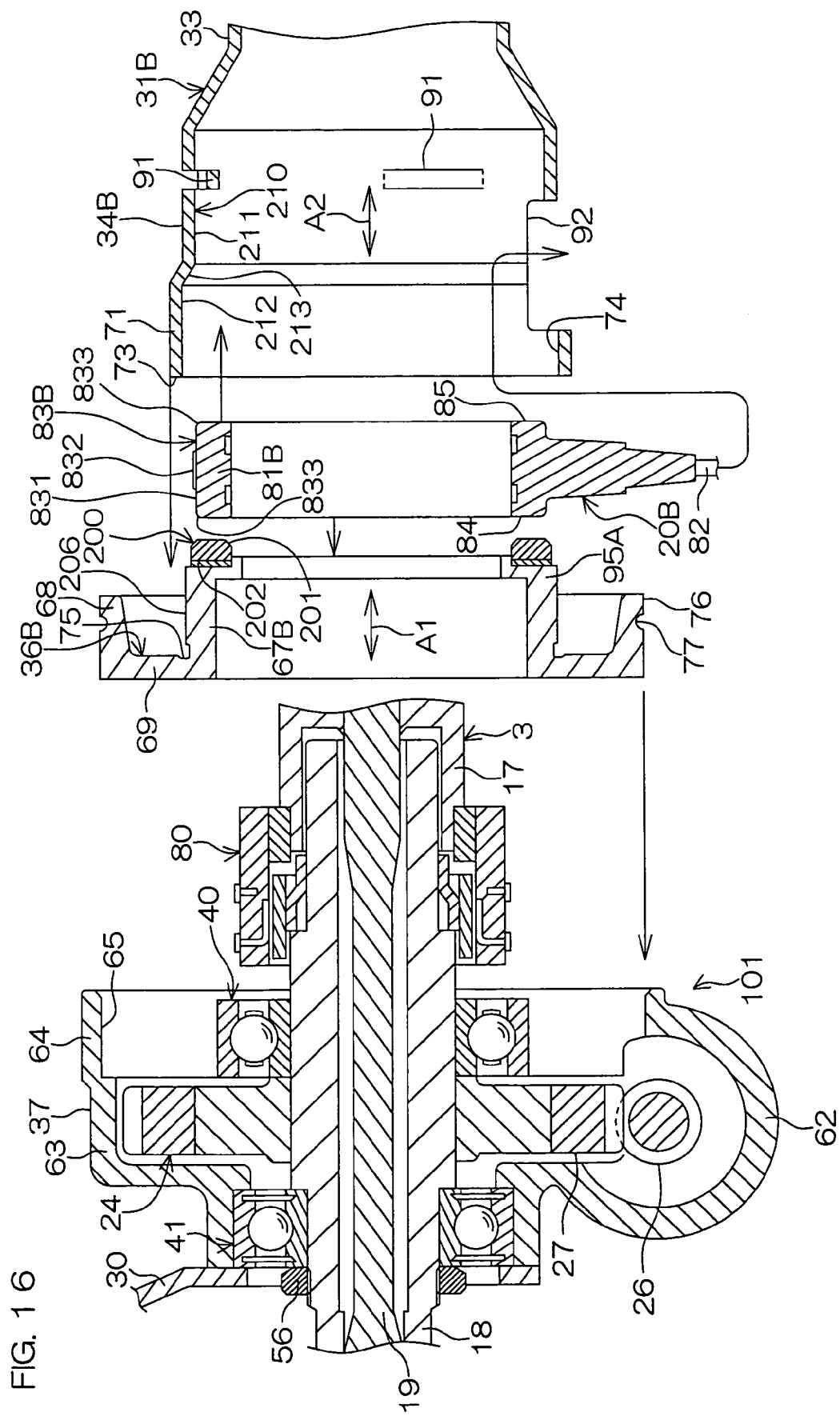
FIG. 16 is an exploded sectional view of major portions of the electric power steering system of FIG. 13.
Figure 17:
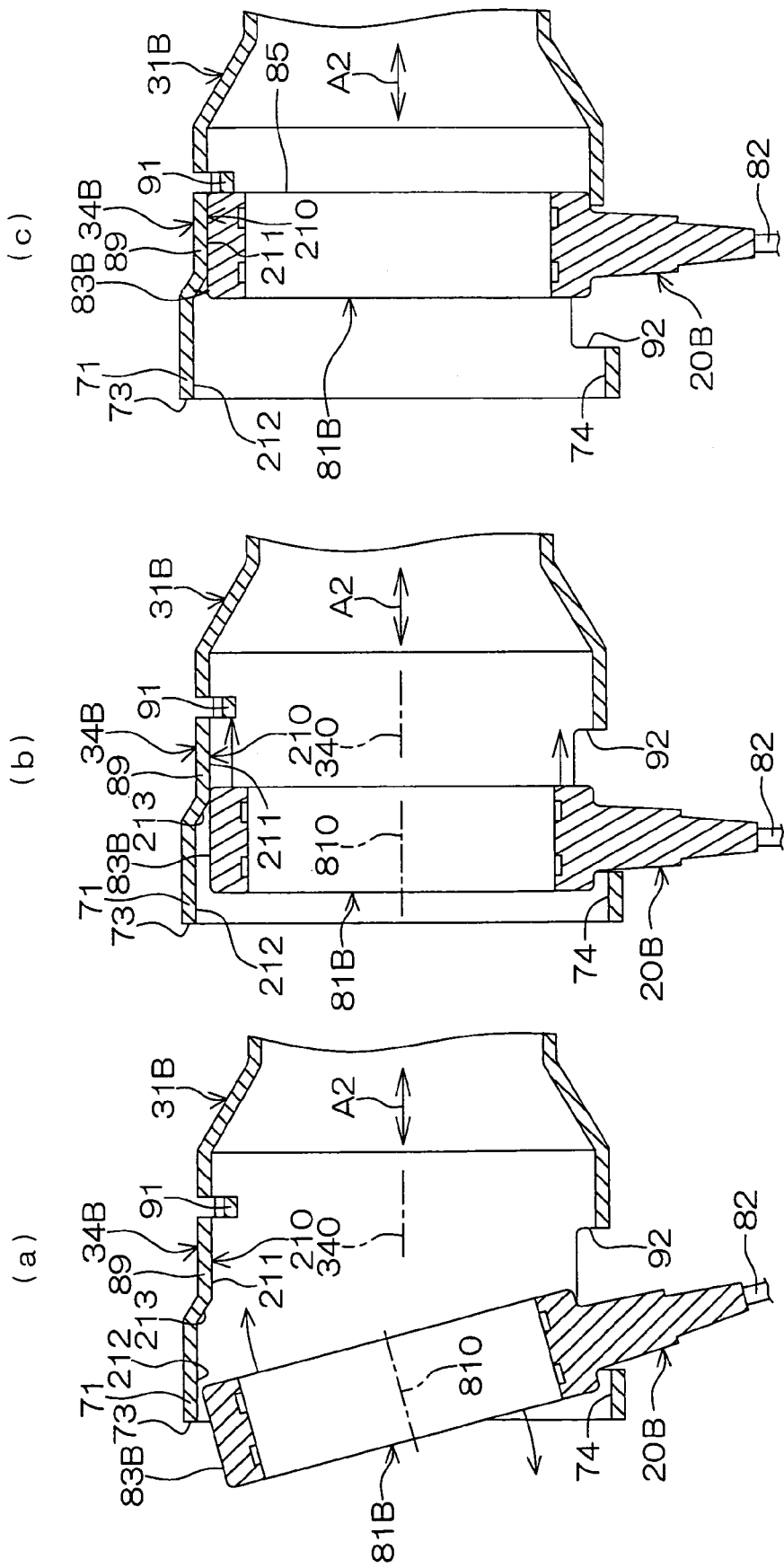
FIGS. 17(a), 17(b) and 17(c) are sectional views sequentially showing the mounting of the torque sensor shown in FIG. 13 in a sensor housing.
Figure 18:
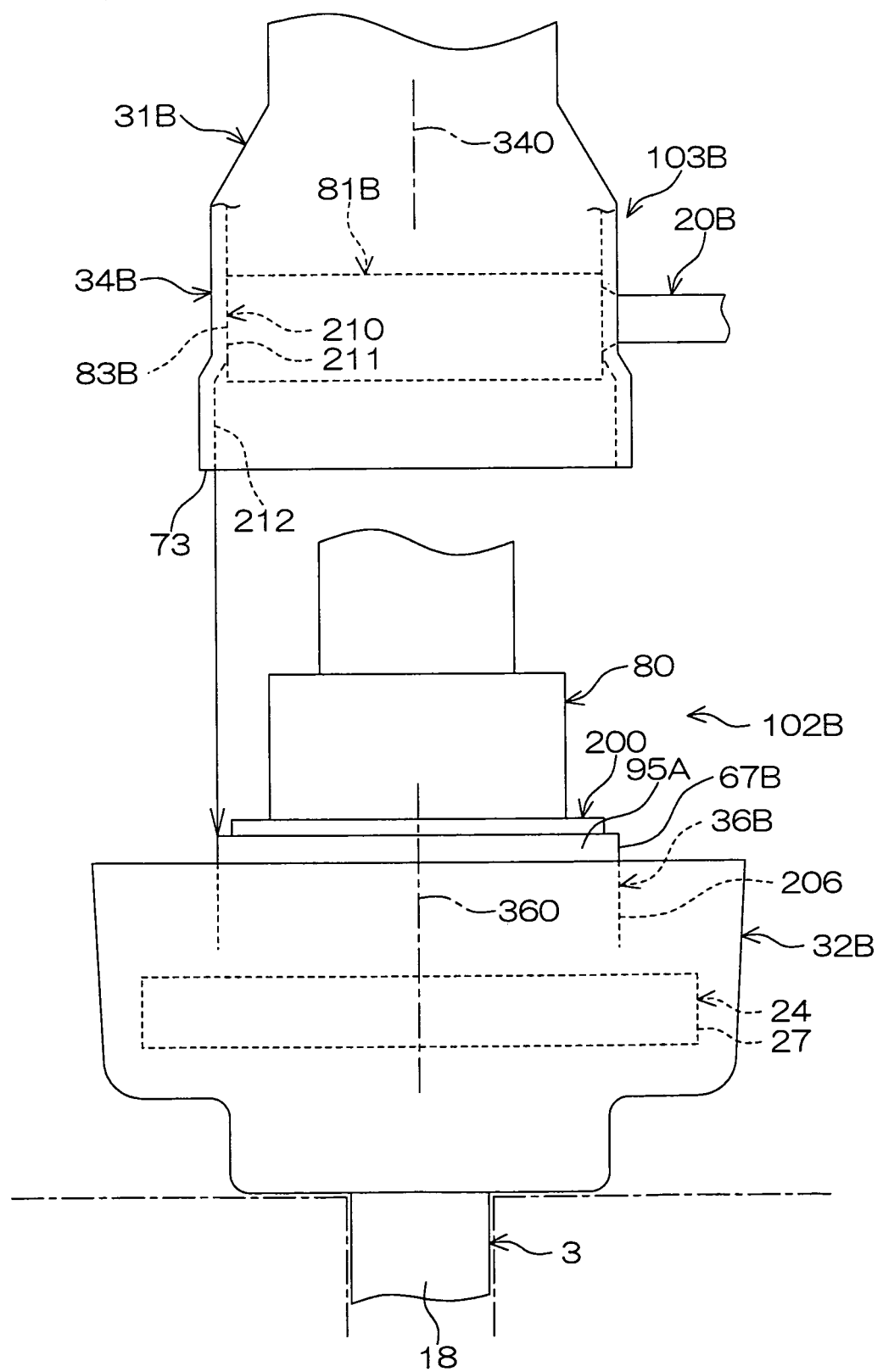
FIG. 18 is an exploded diagram of major portions of the electric power steering system of FIG. 13 during assembling, wherein an assembling jig is also schematically illustrated.

FIG. 15 is a side view of the main body 81B of the torque sensor 20B shown in FIG. 13 as seen axially. FIG. 16 is an exploded sectional view of major portions of the electric power steering system 1. FIGS. 17(a), 17(b) and 17(c) are sectional views sequentially showing the mounting of the torque sensor 20B shown in FIG. 13 in the sensor housing 34B. FIG. 18 is an exploded diagram of major portions of the electric power steering system 1 of FIG. 13 during assembling, wherein an assembling jig is also schematically illustrated in a one-dot-and-dash line.

Referring to FIGS. 15 and 16, the outer periphery 83B of the main body 81B of the torque sensor 20B has a cylindrical surface 831, a plurality of resiliently deformable projections 832, and a pair of chamfers 833. The chamfers 833 respectively connect the corresponding ends 84, 85 to the cylindrical surface 831.

The projections 832 are equidistantly spaced from each other in the circumferential directions B2 of the main body 81B. The projections 832 each project radially outward from the cylindrical surface 831 by a predetermined projection amount. The projection amount of each of the projections 832 is set, for example, at about several tens micrometers.

The projections 832 are resiliently engaged with the first greater diameter portion 211. That is, the diameter of a circumscribed circle extending through distal ends of the projections 832 (a circle concentric to the outer periphery 83B of the main body 81B) is greater than the inner diameter of the first greater diameter portion 211 of the sensor housing 34B. When the main body 81B of the torque sensor 20B is engaged with the inner periphery 210 of the sensor housing 34B, the projections 832 are resiliently compressed radially of the main body 81B. Thus, the main body 81B of the torque sensor 20B is press-fitted to the first greater diameter portion 211 of the inner periphery 210 of the sensor housing 34B with a smaller overlap by applying a smaller force.

Though not shown, a mold divided into mold halves along the diameter of the main body 81B is preferably used for molding the main body 81B of the torque sensor 20B from a resin. Since a direction in which the mold is divided into the mold halves (mold dividing direction) extends along the diameter of the main body 81B, a parting line (linear projection) formed on the outer periphery 83B of the main body 81B is prevented from extending in the circumferential directions B2 of the main body 81B to overlap the projections 832. Therefore, the projections 832 can be accurately provided, thereby preventing the main body 81B from being subjected to an excessively great load applied from the sensor housing 34B.

The center of the cylindrical surface 831 coincides with the center of the torque sensor 20B. The cylindrical surface 831 has a diameter that is equal to or slightly smaller than the inner diameter of the first greater diameter portion 211.

Referring to FIG. 16, the electric power steering system 1 of this embodiment can be assembled, for example, in the following manner. First, the first subassembly 101 described above is assembled. The first subassembly 101 includes the steering shaft 3, the speed reduction mechanism 24, the lower housing 37, the upper bearing 40, the lower bearing 41, the magnetic circuit formation member 80 and the like.

Then, the upper housing 36B is attached to the first subassembly 101. Further, the spacer 200 is attached to the end 95A of the inner tube 67B of the upper housing 36B. Thus, a second subassembly 102B shown in FIG. 18 is provided.

Referring to FIGS. 16 and 18, the torque sensor 20B is mounted in the sensor housing 34B. Thus, a third subassembly 103B is provided. The third subassembly 103B includes the sensor housing 34B and the torque sensor 20B.

Referring to FIGS. 17(a), 17(b) and 17(c), more specifically, the wiring 82 of the torque sensor 20B is inserted into the sensor housing 34B from the opening 74 before insertion of the main body 81B when the main body 81B of the torque sensor 20B is mounted in the sensor housing 34B. Then, the wiring 82 is inserted into the insertion hole 92.

Subsequently, the main body 81B of the torque sensor 20B is turned in the inside of the second greater diameter portion 212 of the inner periphery 210 of the sensor housing 34B from a state in which the center axis 810 of the main body 81B of the torque sensor 20B is inclined with respect to the center axis 840 of the sensor housing 34B. Thus, the center axis 810 of the sensor housing 34B and the center axis 810 of the main body 81B of the torque sensor 20B are parallel to each other or coincide with each other.

In this state, the main body 81B of the torque sensor 20B is moved in the axial directions A1 to be engaged with the first greater diameter portion 211 of the inner periphery 210 of the sensor housing 34B. In this case, the main body 81B of the torque sensor 20B is less liable to be burred as compared with a case in which the main body of the torque sensor is turned to be engaged with the inner periphery of the sensor housing. Then, the end face 85 of the main body 81B is brought into abutment against the two projections 91 of the sensor housing 34B.

Referring to FIG. 18, the third subassembly 103B is combined with the second subassembly 102B. Thus, an assembly is provided in a state shown in FIG. 13. At this time, the sensor housing 34B of the third subassembly 103 serving as a unit may be brought into engagement with the inner tube 67B of the upper housing 36B of the gear housing 32B of the second subassembly 102B from above with the axis of the inner tube 67B directing vertically upward. More specifically, the outer periphery 206 of the inner tube 67B is press-fitted to the second greater diameter portion 212 of the inner periphery 210 of the sensor housing 34B.

The assembling of the second subassembly 102B may precede or follow the assembling of the third subassembly 103B, or may be simultaneous with the assembling of the third subassembly.

Referring to FIG. 16, this embodiment provides the following effects in addition to the effects provided by the first and second embodiments. In this embodiment, the second greater diameter portion 212 is provided which has a greater diameter than the first greater diameter portion 211 to be engaged with the main body 81B of the torque sensor 20B. Therefore, when the torque sensor 20B is mounted in the sensor housing 34B, the coaxial positioning of the main body 81B and the sensor housing 34B is easily achieved by turning the main body 81B of the torque sensor 20B in a radially inward portion of the second greater diameter portion 212.

In this embodiment, the insertion hole 92 of the sensor housing 34B through which the wiring 82 of the torque sensor 20B is passed includes an elongated hole extending from the first greater diameter portion 211 to the second greater diameter portion 212 of the sensor housing 34B. In this case, the main body 81B of the torque sensor 20B disposed coaxially with the sensor housing 34B can be smoothly inserted into the radially inward portion of the first greater diameter portion 211 when the torque sensor 20B is mounted in the sensor housing 34B.

Referring to FIGS. 16 and 18, the outer periphery 83B of the main body 81B of the torque sensor 20B is resiliently engaged with the first greater diameter portion 211 by the plurality of projections 832 formed of a synthetic resin in this embodiment. In this case, the main body 81B of the torque sensor 20B can be retained in the first greater diameter portion 211 by the function of the projections 832 resiliently engaged with the first greater diameter portion 211. Therefore, the sensor housing 34B and the torque sensor 20B can be handled as a unitary unit (corresponding to the third subassembly 103B described above).

Thus, the following production process can be easily performed. That is, the second subassembly 102B described above is supported in a state such that the axis 360 of the inner tube 67B of the upper housing 36B of the gear housing 32B in which the speed reduction mechanism 24 is accommodated is directed vertically upward. The sensor housing 34B of the third subassembly 103B provided as the unit is brought into engagement with the outer periphery 206 of the inner tube 67B of the upper housing 36B of the second subassembly 102B in this state from above. Thus, the electric power steering system 1 is assembled. In this production process, the sensor housing 34B of the above unit can be easily brought into engagement with the gear housing 32B from above.

In addition, where the outer periphery 83B of the main body 81B of the torque sensor 20B includes the cylindrical surface 831 having an outer diameter that is equal to the inner diameter of the first greater diameter portion 211 of the sensor housing 34B, the main body 81B of the torque sensor 20B can be reliably retained in the first greater diameter portion 211.

In the third embodiment, the spacer 200 may be obviated.

In the first and second embodiments, a stopper ring fixed to the sensor housing 34 or a step provided in the inner periphery 90, for example, may be used instead of the projections 91 as the positioning member for the positioning of the torque sensor 20 in the sensor housing 34. Further, other positioning member may be used instead of the inner tube 67 for the positioning of the torque sensor 20. The aforementioned modification is also applicable to the third embodiment.

The embodiments described above may be modified in the following manner. For example, magnetoresistance elements utilizing the magnetoresistance effect may be used as detectors for the first and second magnetic sensors 119, 120 of the torque sensor 20 instead of the Hall element. That is, a magnetic-responsive element having an electrical characteristic (e.g., resistance) variable with the action of the magnetic field may be use. The torque sensor 20 is merely required to include at least one magnetic-responsive element.

The upper bearing 40 may be an open bearing or a seal bearing. The seal bearing may be a sealed bearing or a shield bearing. This is also applied to the lower bearing 41.

While the present invention has been described in detail by way of the specific embodiments thereof, those skilled in the art and understanding the above description will easily conceive modifications, alterations and equivalents of the embodiments. The present invention is to be defined by the purview of the appended claims and their equivalents.

This application corresponds to Japanese Patent Application No. 2008-199889 filed in the Japanese Patent Office on Aug. 1, 2008, the disclosure of which is incorporated herein by reference in its entirety.

Reference Signs List

1: Electric power steering system
2: Steering member
3: Steering shaft
12: Vehicle body
20, 20B: Torque sensor
23: Electric motor
24: Speed reduction mechanism
26: Worm
27: Worm wheel
31, 31B: Column tube
32, 32A, 32B: Gear housing
34, 34B: Sensor housing
36, 36A, 36B: Upper housing 37: Lower housing
40: Upper bearing
41: Lower bearing
44: Outer ring of upper bearing
64: Connection portion (Upper portion of lower housing)
65: Engagement surface (Inner periphery of upper portion of lower housing)
67, 67A, 67B: Inner tube
68: outer tube
69: Connection wall
71: Lower portion of sensor housing
72: Inner periphery of lower portion of sensor housing
73: Lower end of sensor housing
75: Annular groove
76: Outer periphery of outer tube
77: Groove
81, 81B: Main body
82: Wiring
83, 83B: Outer periphery of main body
84: End face of main body
86: Portion (Part of spherical surface)
90: Inner periphery of sensor housing
91: Projections (Positioning member)
92: Insertion hole
95, 95A: End of inner tube
200, 200A: Spacer
201, 201A: Resilient member
202: Metal core
204: Space
205: Excess portion (Part of resilient member)
206: Outer periphery of inner tube
210: Inner periphery of sensor housing
211: First greater diameter portion (Inner periphery)
212: Second greater diameter portion (Inner Periphery of lower portion)
832: Projections
A1, A2: Axial directions
B1, B2: Radial directions

The invention claimed is:

1. An electric power steering system comprising:
   a column tube which rotatably supports a steering shaft coupled to a steering member;
   a tubular sensor housing configured by increasing a diameter of an axially lower portion of the column tube;
   a torque sensor accommodated in the sensor housing for detecting a steering torque;
   a speed reduction mechanism which transmits rotation of a steering assist electric motor to the steering shaft;
   a gear housing which accommodates the speed reduction mechanism; and
   an upper bearing and a lower bearing disposed on upper and lower sides of the speed reduction mechanism and rotatably supporting the steering shaft;
   wherein the gear housing includes a tubular lower housing which rotatably supports the steering shaft via the lower bearing, and an upper housing;
   wherein the upper housing includes an inner tube, an outer tube and an annular connection wall connecting the inner tube and the outer tube;
   wherein the outer tube is press-fitted to an inner periphery of an upper portion of the lower housing;
   wherein the inner tube rotatably supports the steering shaft via the upper bearing;
   wherein the inner tube is press fitted to an inner periphery of an axially lower portion of the sensor housing, whereby the inner tube has a reduced diameter so that an outer ring of the upper bearing is Lightly fitted and supported in the inner tube.

2. The electric power steering system according to claim 1, wherein the torque sensor includes an annular main body engaged with the inner periphery of the sensor housing.

3. The electric power steering system according to claim 2, wherein the torque sensor is positioned axially of the sensor housing with an end of the inner tube in abutment against an end face of the main body of the torque sensor.

4. The electric power steering system according to claim 3,
   wherein the sensor housing includes a positioning member projecting inward thereof,
   wherein the main body of the torque sensor is held between the end of the inner tube and the positioning member.

5. The electric power steering system according to claim 2,
   wherein an annular spacer is provided between an end of the inner tube of the upper housing and an end face of the main body of the torque sensor,
   wherein the spacer includes an annular resilient member which is resiliently compressed axially,
   wherein the sensor housing includes a positioning member projecting inward thereof,
   wherein the main body of the torque sensor and the spacer are held between the end of the inner tube and the positioning member.

6. The electric power steering system according to claim 5,
   wherein the spacer includes an annular metal core to which the resilient member is fixed.

7. The electric power steering system according to claim 5,
   wherein a space is provided between a part of an outer periphery of the main body of the torque sensor and the inner periphery of the sensor housing,
   wherein a part of the resilient member is resiliently compressed radially of the sensor housing to be accommodated in the space.

8. The electric power steering system according to claim 2,
   wherein the torque sensor includes a wiring extending from a part of an outer periphery of the main body,
   wherein the sensor housing has an insertion hole through which the wiring extends out of the sensor housing.

9. The electric power steering system according to claim 8,
   wherein he outer periphery of the main body of the torque sensor includes a part of a spherical surface.

10. The electric power steering system according to claim 8,
    wherein the insertion hole is sealed with the inner tube and the main body of the torque sensor.

11. The electric power steering system according to claim 2,
    wherein the connection wall has an annular groove extending around the inner tube,
    wherein an axially lower end of the sensor housing is inserted in the annular groove.

12. The electric power steering system according to claim 2,
    wherein the outer tube has a groove provided in an outer periphery thereof as extending circumferentially thereof.

13. The electric power steering system according to claim 2,
    wherein the inner periphery of the sensor housing includes a first greater diameter portion, and a second greater diameter portion having a greater diameter than the first greater diameter portion,
    wherein an outer periphery of the main body of the torque sensor is engaged with the first greater diameter portion, wherein an outer periphery of the inner tube of the upper housing is press-fitted to the second greater diameter portion.

14. The electric power steering system according to claim 13,
wherein the torque sensor includes a wiring extending from a part of the outer periphery of the main body,
wherein the sensor housing has an insertion hole through which the wiring extends out of the sensor housing,
wherein the insertion hole includes an elongated hole extending from the first greater diameter portion to the second greater diameter portion of the sensor housing.

15. The electric power steering system according to claim 13,
wherein the outer periphery of the main body of the torque sensor is formed of a synthetic resin,
wherein the torque sensor includes a plurality of resiliently deformable projections disposed on the outer periphery of the main body thereof in circumferentially spaced relation,
wherein the projections are resiliently engaged with the first greater diameter portion.

16. The electric power steering system of claim 1, wherein the sensor housing and the column tube are unitarily formed of a single material.

* * * * *

UNITED STATES PATENT AND TRADEMARK OFFICE
CERTIFICATE OF CORRECTION

PATENT NO. : 8,448,742 B2
APPLICATION NO. : 12/737622
DATED : May 28, 2013
INVENTOR(S) : Yoshikazu Kawada et al.

Page 1 of 1

It is certified that error appears in the above-identified patent and that said Letters Patent is hereby corrected as shown below:

In the Claims

IN CLAIM 1:

Column 21, line 66, after "tube is" change "press fitted" to --press-fitted--; and Column 22, line 2, after "bearing is" change "Lightly fitted" to --tightly fitted--.

IN CLAIM 9:

Column 22, line 43, after "wherein" change "he outer" to --the outer--.

Signed and Sealed this
Thirtieth Day of July, 2013

Teresa Stanek Rea
*Acting Director of the United States Patent and Trademark Office*